US010673771B2

(12) United States Patent
Specter et al.

(10) Patent No.: US 10,673,771 B2
(45) Date of Patent: *Jun. 2, 2020

(54) PLATFORM-AGNOSTIC THICK-CLIENT SYSTEM FOR COMBINED DELIVERY OF DISPARATE STREAMING CONTENT AND DYNAMIC CONTENT BY COMBINING DYNAMIC DATA WITH OUTPUT FROM A CONTINUOUS QUEUE TRANSMITTER

(71) Applicant: CGIP HOLDCO, LLC, Stamford, CT (US)

(72) Inventors: Jeffrey Specter, Stamford, CT (US); Vineet Choudhary, Austin, TX (US); Lei Zhu, Bronxville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/038,841

(22) Filed: Jul. 18, 2018

(65) Prior Publication Data

US 2019/0109798 A1 Apr. 11, 2019

Related U.S. Application Data

(63) Continuation-in-part of application No. 15/870,978, filed on Jan. 14, 2018, now Pat. No. 10,055,508.
(Continued)

(51) Int. Cl.
*G06F 15/16* (2006.01)
*H04L 12/873* (2013.01)
(Continued)

(52) U.S. Cl.
CPC .......... *H04L 47/522* (2013.01); *G06F 16/435* (2019.01); *G06F 16/9577* (2019.01);
(Continued)

(58) Field of Classification Search
CPC . H04L 47/522; H04L 65/605; H04L 65/1059; H04L 65/604; H04L 65/60;
(Continued)

(56) References Cited

U.S. PATENT DOCUMENTS

| 5,680,619 A | 10/1997 | Gudmundson et al. |
| 7,533,144 B2 | 5/2009 | Kassab |

(Continued)

FOREIGN PATENT DOCUMENTS

WO  WO2015103636  7/2015

OTHER PUBLICATIONS

AFraternali et al. Model-Driven Development of Web Applications: The Autoweb System • Oct. 2000 DOI: 10.1145/358108.358110 Retrieved: Sep. 25, 2017.

*Primary Examiner* — Krisna Lim
(74) *Attorney, Agent, or Firm* — Caldwell Intellectual Property Law

(57) ABSTRACT

A platform-agnostic thick client system for remotely combining dynamic data with a continuous quantum queue includes a first corpus of data on a server, a dynamic content transmitter to generate and transmit to the remote device a packet set that combines the second corpus with a client redirection link that causes a display window to load a second packet set and a client-side module that configures the remote device to receive the dynamic packet set at the remote device and generate a static display including a first content viewing portion displaying the dynamic packet set, with the client-redirection link modified to load in a third content display portion. System may include a continuous queue transmitter to transmit quanta to a remote device, and client-side module may configure remote device to receive quanta, and static display may include a second content viewing portion that continuously displays quanta.

20 Claims, 21 Drawing Sheets

Related U.S. Application Data

(60) Provisional application No. 62/571,051, filed on Oct. 11, 2017.

(51) Int. Cl.
  *H04N 21/44* (2011.01)
  *H04L 29/06* (2006.01)
  *H04L 12/24* (2006.01)
  *G06F 16/435* (2019.01)
  *G06F 16/957* (2019.01)

(52) U.S. Cl.
  CPC ...... *H04L 41/0803* (2013.01); *H04L 65/1059* (2013.01); *H04L 65/60* (2013.01); *H04L 65/604* (2013.01); *H04L 65/605* (2013.01); *H04L 65/80* (2013.01); *H04N 21/44004* (2013.01)

(58) Field of Classification Search
  CPC ... H04L 65/80; H04L 41/0803; G06F 16/435; G06F 16/9577
  USPC ........................................................ 709/231
  See application file for complete search history.

(56) References Cited

U.S. PATENT DOCUMENTS

| | | |
|---|---|---|
| 8,713,112 B2 | 4/2014 | Hewitt et al. |
| 9,170,700 B2 | 10/2015 | Kaiser et al. |
| 9,413,781 B2 * | 8/2016 | Cunningham ...... H04L 63/1441 |
| 9,733,809 B1 | 8/2017 | Greene et al. |
| 2002/0004753 A1 | 1/2002 | Perkowski |
| 2006/0026162 A1 | 2/2006 | Salmonsen et al. |
| 2006/0248570 A1 | 11/2006 | Witwer |
| 2008/0184117 A1 | 7/2008 | Alsbury et al. |
| 2009/0288015 A1 | 11/2009 | Fujioka |
| 2015/0220264 A1 | 8/2015 | Lewis et al. |
| 2015/0370920 A1 | 12/2015 | Van Os et al. |

* cited by examiner

US 10,673,771 B2

PLATFORM-AGNOSTIC THICK-CLIENT SYSTEM FOR COMBINED DELIVERY OF DISPARATE STREAMING CONTENT AND DYNAMIC CONTENT BY COMBINING DYNAMIC DATA WITH OUTPUT FROM A CONTINUOUS QUEUE TRANSMITTER

RELATED APPLICATION DATA

The present application is a continuation in part of U.S. patent application Ser. No. 15/870,978, filed on Jan. 14, 2018, patented as U.S. Pat. No. 10,055,508 B1 with an issue date of Aug. 12 2018 and titled "PLATFORM-AGNOSTIC THICK-CLIENT SYSTEM FOR COMBINED DELIVERY OF DISPARATE STREAMING CONTENT AND DYNAMIC CONTENT BY COMBINING DYNAMIC DATA WITH OUTPUT FROM A CONTINUOUS QUEUE TRANSMITTER," which claims the benefit of priority of U.S. Provisional Patent Application Ser. No. 62/571,051, filed on Oct. 11, 2017, and titled "PLATFORM-AGNOSTIC THICK CLIENT SYSTEM FOR REMOTELY COMBINING DYNAMIC DATA WITH A CONTINUOUS QUANTUM QUEUE." Each of U.S. patent application Ser. No. 15/870,978 and U.S. Provisional Patent Application Ser. No. 62/571,051 is incorporated by reference herein in its entirety.

FIELD OF THE INVENTION

The present invention generally relates to the field of streaming over computing networks. In particular, the present invention is directed to a platform-agnostic thick-client system for combined delivery of disparate streaming content and dynamic content by combining dynamic data with a continuous quantum queue.

BACKGROUND

If a site owner places media (video or audio) on their site, they need a media player for it to play. This requires each media file or stream to be played by a separate and unique media player. For example, if a site embedded 5 videos on a page, each video would require a separate unique embedded player. The same is true for on-demand audio: 5 audio clips would require 5 separate embedded players. For streaming audio each stream URL requires its own unique pop out player. And because each media player, (both embedded and pop out) is unique, none can communicate with the others. They can't turn themselves off when another begins and that causes overlapping play of media. The user is forced to turn off each video or audio manually before starting another to avoid the overlap of each other. This is the case for pop out players and embedded players and is a terrible consumer experience. Additionally, in the case of embedded players if the user changed pages on the site, the media would stop. Embedded players only work on the page they live on since each is a separate code base.

Pop out players have a unique problem. They open in a separate browser window or tab, and to control the player you must leave the main site, driving the site's traffic away to a URL the site does not control. If a site tries to embed the actual pop out player onto one of its site pages, the stream will stop as soon as the user changes pages on the site. All this has made sites that use audio and/or video a confusing mix of competing media players, with differing control features. Video and audio sources play over each other, the media stops when a page is changed, and in the case of pop out players, the audience is driven to a third-party player in a different window or tab. It is a frustrating experience for the end user and a poor way for sites to offer media to be watched and listened to.

SUMMARY OF THE DISCLOSURE

In one aspect, a platform-agnostic thick-client system for combined delivery of disparate streaming content and dynamic content by combining dynamic data with output from a continuous queue transmitter, the system comprising includes at least a server designed and configured to provide a first corpus of data. The system includes a dynamic content transmitter. The dynamic content transmitter is configured to generate a first dynamic packet set that combines at least first a portion of the first corpus with a first client redirection link that directs an entire display window of a client program at the remote device to load a second dynamic packet set upon activation and transmit the first dynamic content packet set to the remote device. The system includes a client-side module operating on the at least a server. The client-side module designs and configures the remote device to receive the dynamic content packet set at the remote device, parse the dynamic content packet set to identify the first client redirection link, determine that the second dynamic packet set is located at the at least a server, and generate a continuous application layer in the display window. The continuous application layer includes a first content viewing portion displaying a first view of the dynamic content packet set at a display of the remote device and a modified first client redirection link in the first content viewing portion, wherein selection of the modified first client redirection link causes the first content viewing portion to load a first view of the second dynamic packet set upon activation. The continuous application layer includes a second content viewing portion displaying with the first content viewing portion, wherein the second content viewing portion continues to display upon activation of the modified first client redirection link.

In another aspect, a method of remotely combining dynamic data with a continuous quantum queue, includes continuously transmitting, by a continuous queue transmitter operating on at least a server, quanta from a first-in-first-out (FIFO) queue over a network to a remote device, the quanta generated from a second corpus of data on the at least a server. The method includes transmitting, by a dynamic content transmitter operating on the server, a first dynamic content packet set to the remote device, the first dynamic content packet set including at least a first portion of at least a first corpus and a client redirection link that directs an entire display window of a client program at the remote device to load a second dynamic packet set upon activation. The method includes configuring, by a client-side module operating on the server, the remote device to receive the dynamic content packet set at the remote device, parse the dynamic content packet set to identify the client redirection link, determine that the second dynamic packet set is located at the at least a server; continuously receive quanta of the continuously transmitted quanta, and generate a continuous application layer in the display window, the continuous application layer including a first content viewing portion displaying a first view of the dynamic content packet set at a display of the remote device, a second content viewing portion including a continuous output that continuously inputs the received quanta and displays each received quantum at a display of the remote device, and a modified client redirection link that causes the remote device to load the second dynamic packet set in the second content viewing upon activation. Loading the second dynamic packet set in the first viewing portion does not modify the continuous output of the second viewing portion.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to system that, when implemented on a site hosted on a web browser, converts that site into an "web app" giving the site the functionality previously found only in native IOS or Android apps. For instance, a traditional website renders HTML content page by page (i.e.: each new click of linked content from any page in their site, reloads the web browser with the requested page's content. The browser URL address is updated with the new content location.); the browser URL address is updated with the new content location. Embodiments of the present invention allow this type of typical traditional website to convert into a modern web application which does not fully reload the browser. This may be accomplished in some embodiments using a client-side program placed onto a page of a website, that intercepts user clicks to any in-domain links and dynamically creates a nested iframe for the requested content (content frame); the client-side program, which may include JavaScript code, may install rapidly and easily without any install-time inspection of elements of the webpage itself. Visually the user may see the new content, and using, for instance, HTML5 pushState the browser's address bar may be updated with the new content's location. Subsequent requests for in-domain content may continue to load within the "content frame"; the client-side module may listen for state changes and continue to update the browser address bar to reflect the location of the content which the user is viewing. The application may continue to run in the parent frame allowing for a continuous web application layer, which never gets disrupted as the user navigates the website.

In some embodiments, this may permit media (audio, video) to be continuously played as the user navigates to different pages within the website. When the user clicks on an in-domain URL, the client-side program may cause the browser transfer to and in-frame mode. This may enable the site to play video and audio directly from all the pages of the site without the need for a pop out player. When a site installs a platform implementing the continuous application layer, all media is controlled by the player bar as part of the continuous application layer and the media files or stream URLs will continue to play without interruption as the user changes pages of the site.

Figure 1:
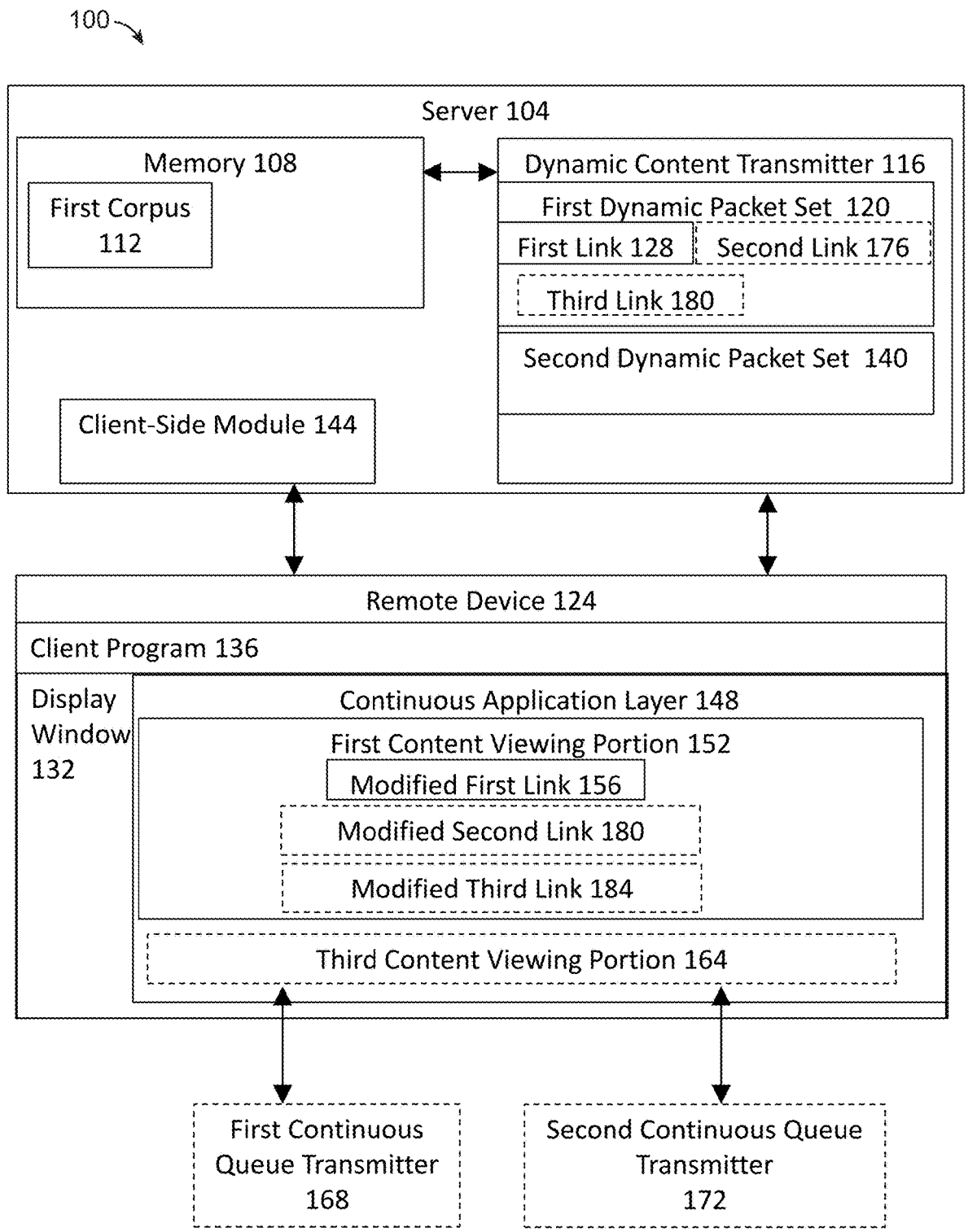
FIG. 1 is a block diagram illustrating an exemplary system in an embodiment.

Referring now to FIG. 1, an exemplary embodiment of a platform-agnostic thick-client system 100 for combined delivery of disparate streaming content and dynamic content by combining dynamic data with output from a continuous first in first out (FIFO) quantum queue is illustrated. The system 100 includes at least a server 104. At least a server 104 may be any computing device as described below in reference to FIG. 16. At least a server 104 may be any combination of computing devices as described below in reference to FIG. 16. At least a server 104 may be connected to a network as described below in connection with FIG. 16; the network may be the Internet. At least a server 104 may include, for instance, a first server or cluster of servers in a first location and a second server or cluster of servers in a second location. At least a server 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. At least a server 104 may include one or more computing devices dedicated to data storage, security, distribution of traffic for load balancing, and the like. At least a server 104 may distribute one or more computing tasks as described below across a plurality of computing devices of at least a server 104, which may operate in parallel, in series, redundantly, or in any other manner used for distribution of tasks or memory between computing devices.

Continuing to refer to FIG. 1, memory 108 of at least a server 104 may include any one or more memory devices as described below in reference to FIG. 16, which may be incorporated in at least a server 104 or in a separate computing device or other electronic data storage apparatus. Any item, datum, combination of data, data structure, or the like stored in memory 108 may be stored according to any suitable protocol, and using any suitable system 100, including without limitation databases, file storage protocols, and the like. Memory 108 may include dedicated computing devices of at least a server 104. Memory 108 may include cloud storage; for instance, at least a server 104 may access memory at one or more remote datacenters.

Still referring to FIG. 1, at least a server 104 is designed and configured to provide a first corpus 112 of data. First corpus 112 may include any data that may be stored in electronic format, including without limitation textual data, data stored as source code, data stored as executable code, or data in a format for interpretation. First corpus 112 may include data in structured human-readable or machine-readable forms such as extensible markup language (XML), hypertext markup language (HTML), comma-separate value (CSV) format, or the like. First corpus 112 may include combinations of types of data in one or more files. As a non-limiting example, first corpus 112 may include a file that is wholly or partially executed on at least a server 104 for transmission to a remote device, such as a PHP: Hypertext Preprocessor (PHP) file, action server page (ASP), or Java Server Page (JSP) file. First corpus 112 may include instructions, programming, or other elements that are rendered on a device displaying first corpus 112 or an output derived therefrom as creating interactive material for users, such as hypertext links, buttons, text entry fields, and the like. First corpus 112 may include client-side programming, such as scripting language or code, such as JavaScript or Java applets, that executes on a remote device; such client-side programming may run automatically upon reception of all or part of first corpus 112 at a remote device, may be triggered by one or more event handlers, such as event handlers that detect a user interaction with remote device, or a combination thereof.

Still referring to FIG. 1, system 100 includes a dynamic content transmitter 116. Dynamic content transmitter 116 may include any hardware module or logic circuitry. Dynamic content transmitter 116 may be instantiated using one or more commands of computer control logic. In an embodiment, dynamic content generator may be configured to generate a first dynamic packet set 120 that combines at least first a portion of the first corpus 112 with an event handler that generates at least a second portion of the first corpus 112. First dynamic packet set 120 may include, without limitation, data that a remote device 124 renders and displays as text, data that remote device 124 renders and displays as hyperlinks, data that remote device 124 renders and displays as event handlers, and the like. Dynamic content transmitter 116 is designed and configured to generate a first dynamic packet set 120 that combines at least first a portion of the first corpus with a first client redirection link 128 that directs an entire display window 132 of a client program 136 at the remote device to load a second dynamic packet set 140 upon activation. First client redirection link 128 may be any item that performs the above-described action, including any item that is displayed on remote device 124, including without limitation in display window 132 and may be activated by the user by way of any input device or devices. As a non-limiting example, first client redirection link 128 may include a hyperlink containing or referring to a uniform resource locator (URL) referring to second dynamic packet set 140; first client redirection link 128 may include any other item that when activated by a user causes second dynamic packet set 140 to display in the entire display window 132 of the client program 136, including without limitation buttons, images, portions of images, and the like. Redirection may be performed using any event handler, including without limitation event handlers detecting the click of a mouse or other locator, access of first client redirection link 128 using a touchscreen, the selection of any key, mouseover events, and the like. Redirection may likewise be performed automatically without a direct selection by user, for instance by updating the page via JavaScript (window.location.href='http:// . . . '). Activation of any redirection link or other user control as described herein may be performed using any user input or combination of user inputs, including without limitation voice commands, keyboard inputs, mouse command inputs, game controllers, and the like.

Figure 2:
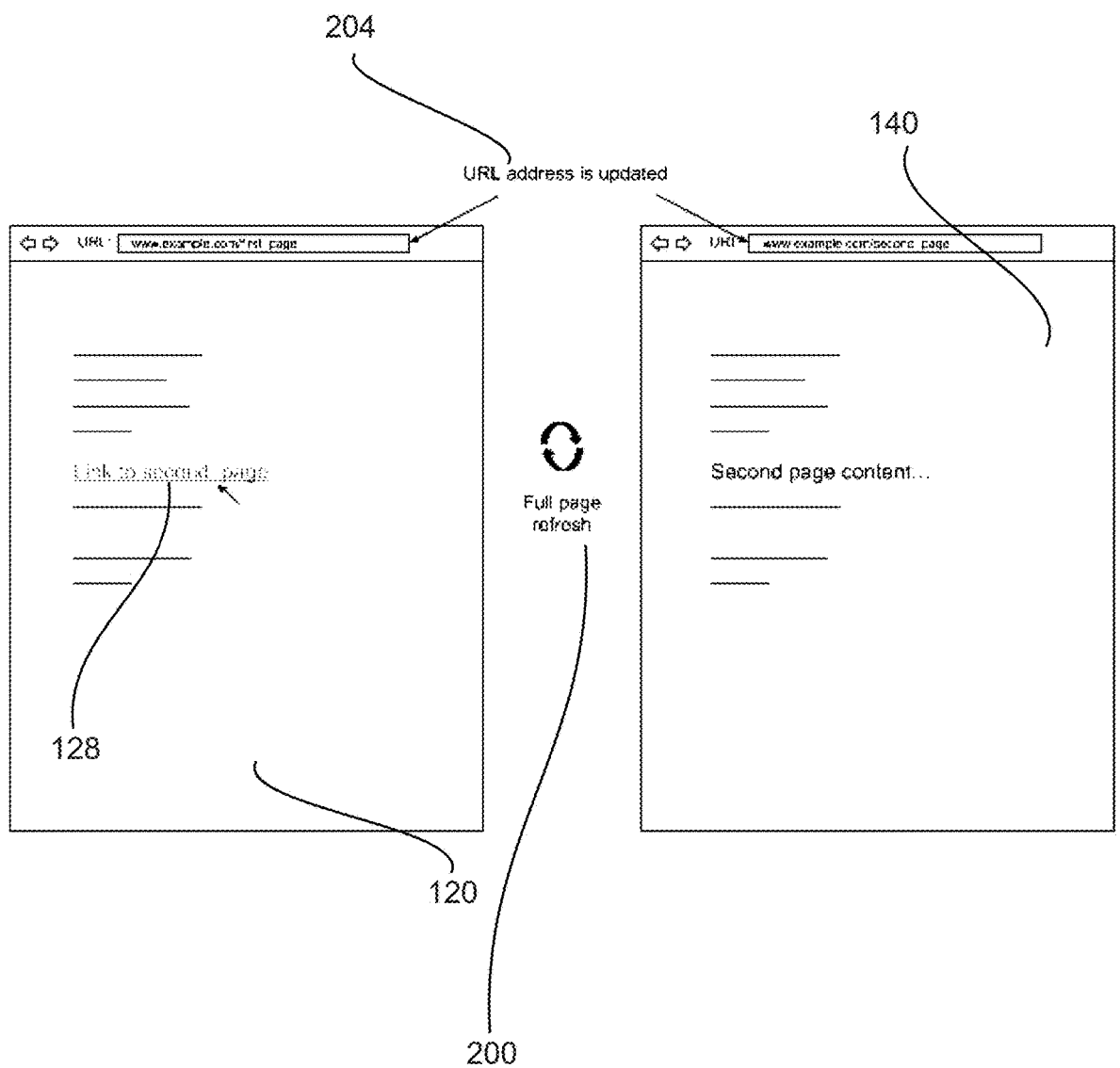
FIG. 2 is a schematic display-flow diagram of an exemplary embodiment of dynamic packet set implemented in a traditional web architecture.

Referring now to FIG. 2, a schematic display-flow diagram of an exemplary embodiment of dynamic packet set 120 containing first client redirection link 128 as implemented using traditional website architecture is illustrated. Following traditional website architecture, activation each new page may be freshly loaded into the browser 200 after the user clicks page links which link to other content within the same website. When a user clicks a link to another page within the given website, the browser may fetch the content of that page, loading and displaying that page; thus moving away from the previous page. The address bar URL may subsequently reflect the address of the current page in view 204.

Referring again to FIG. 1, client program 136 may be any program capable of displaying first dynamic packet set 120, including without limitation web browsers, applications, mobile applications, and the like. Client program 136 may be configurable using executables, scripting languages, markup languages, and the like, including without limitation HTML, extensible stylesheet language transformations (XSLT), JavaScript, applets, and the like. Display window 132 may a portion of a display of remote device 124 used by client program 136 to display packet sets such as first dynamic packet set 120 and/or second dynamic packet set 140. Display window 132 may be a window that ordinarily displays content when a user activates a link such as first client redirection link 128. For instance, where client program 136 is a web browser, user selection of a link may cause the client program 136 to display content corresponding to a URL included in the link in display window 132.

Continuing to refer to FIG. 1, dynamic content transmitter 116 may generate first dynamic packet set from at least a portion of first corpus 112 by any suitable means or method, including without limitation executing one or more programs or algorithms usable to generate packet sets for display on web browsers and the like. For instance, and without limitation, dynamic content transmitter 116 may execute a JSP, ASP, or other server-side program to generate first dynamic packet set 120. Dynamic content transmitter 116 may produce one or more packets of data for transmission over network to remote device 124, the one or more packets of data together constituting first dynamic packet set 120. Dynamic content transmitter 116 may generate other dynamic packet sets in the same way, including second dynamic packet set 140; second dynamic packet set 140 may be generated from second corpus 612 or any other corpus according to any means and/or methods suitable for generation of first dynamic packet set 120. Dynamic content transmitter 116 may be designed and configured to transmit one or more dynamic packet sets, including without limitation first dynamic packet set 120 and second dynamic packet set 140 to a remote device, which may include without limitation remote device 124.

Still referring to FIG. 1, system 100 includes a client-side module 144 operating on the at least a server 104. Client-side module 144 may include any hardware module or logic circuitry. Client-side module 144 may be instantiated using one or more commands of computer control logic. Client-side module 144 designs and configures the remote device 124; client-side module 144 may design and configure remote device 124 using one or more client-side programs, which may be generated using scripting languages such as JavaScript, executables such as applets or other compiled code, and the like; for instance, client-side module 144 may include a client-side program and/or scripting language embedded in first dynamic packet set 120, second dynamic packet set 140 and/or other dynamic packet sets or sets of data provided to remote device 124. Client-side module 144 may operate by reference to or combination with a library of commands; library of commands may be in any suitable form including computer-executable code, interpreted code, scripting, or any other form that may be used to configure a device as set forth in further detail below. Library may be provided on at least a server 104 or on a third-party device, such as another server. In an embodiment, client-side module may operate by loading library and transmitting it to remote device 124; alternatively, client-side module may operate by referring remote device to library so remote device can either download part or all of library, or be remotely configured by part or all of library. Each of these processes, singly or in combination, may be used by client-side module 144 to configure remote device 124.

In an embodiment, client-side module 144 designs and configures remote device 124 to receive first dynamic packet set 120 at the remote device 124. Client-side module 144 designs and configures remote device 124 to parse first dynamic packet set 120 to identify one or more elements, including without limitation first client redirection link 128. Client-side module 144 may configure, for instance, client program 136 to parse first dynamic packet set 120. Remote device 124 so configured, for instance using configured client program 136, may parse textual or binary data making up first dynamic packet set 120 for elements including first client redirection link 128, for instance by identifying patterns of text or binary data client program 136 interprets as instantiating first client redirection link 128. Remote device 124 as configured by client-side module 144 may traverse a data structure, such as without limitation a document-object model (DOM) to locate elements such as links or other user-interaction elements, including without limitation first client-redirection link.

Continuing to refer to FIG. 1, client-side module 144 may design and configure remote device 124, for instance and without limitation by designing and configuring client program 136, to determine that second dynamic packet set 140 is located at or in at least a server 104. As a non-limiting example, remote device 124 as configured by client-side module 144 may extract from first client redirection link 128 information identifying a location of second dynamic packet set 140; information may include a URL, which remote device 124 as configured by client-side module 144 may parse for domain name, where a matching domain name indicates that second dynamic packet set 140 is located at or in at least a server 104. Information may include a relative locator, such as a partial URL or a command to display a document or other item from a subdirectory at or in at least a server 104; the use of such a relative locator 122 may be interpreted by remote device 124, as configured by client-side module 144, as indicating that second dynamic packet set 140 is located at or in at least a server 104. Where second dynamic packet set 140 is so located, first client redirection link 128 may be referred to as "in domain," as a link that directs to content that is located at the at least a server 104. Note that remote device 124, as configured by client-side module, may perform further checks prior to performing additional actions as described herein, including without limitation determining that second dynamic packet set 140 is accessed according to an identical protocol to (e.g., hypertext transfer protocol (HTTP), or the like) that is being used to access first dynamic packet set 120.

Still referring to FIG. 1, client-side module 144 may design and configure remote device 124 to generate a continuous application layer 148 in display window 132. Continuous application layer 148 may be a display that occupies the entirety of display window 132 and does not get replaced by other displays occupying the entirety of display window 132 during navigation of dynamic packet sets provided by at least a server 104. Continuous application layer 148 may include a first content viewing portion 152. Initialization of any action by remote device 124 may be accomplished by any suitable means, including any user activation of remote device 124 either directly or indirectly, to start any embodiment of client program 136, automated access by client program 136 of any data in first dynamic packet set 120, second dynamic packet set 140, any streaming data or queue-provided data as described below, and/or any other data described herein as received and/or displayed by remote device 124; loading of any particular item of data may be performed in response to user commands and/or automatedly performed by pre-programmed loading by client program 136, such as without limitation automatically loading data from a native app incorporated in embodiments of system 100. User commands may be provided using any suitable input including mouse, keyboard, touchscreen, touchpad, voice inputs, and the like. Initialization and/or startup of client program 136 may occur automatically, for instance upon boot-up of remote device 124 and/or in response to any event, command script, or the like.

Figure 3:
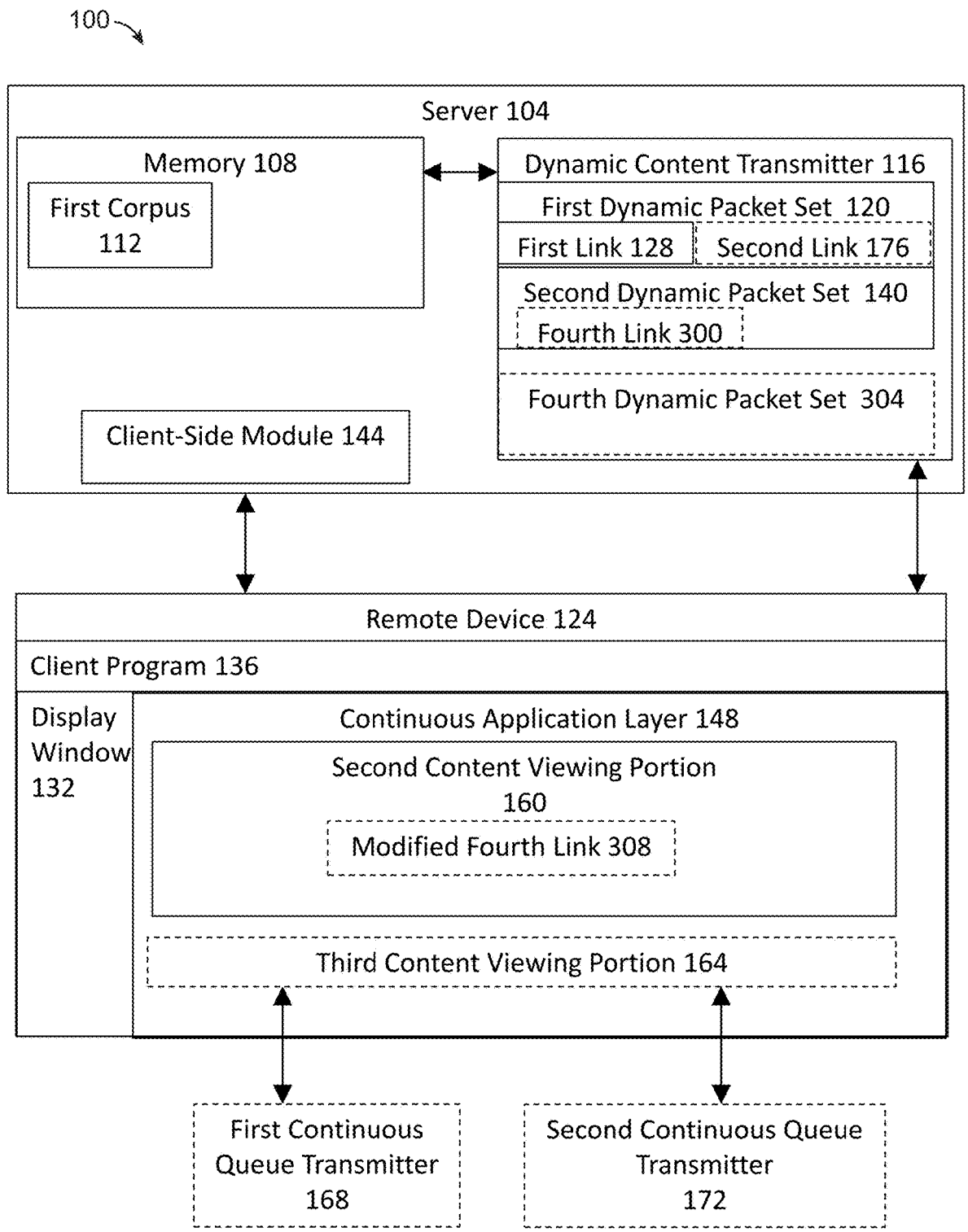
FIG. 3 is a block diagram illustrating an exemplary system in an embodiment.

With continued reference to FIG. 1, client-side module 144 may design and configure remote device 124 to display a modified first client redirection link 156 in the first content viewing portion. Activation of modified first client redirection link 156, such as selection by a user or invocation of an automatic redirection process as described above, may create a second content viewing portion 160. Activation of modified first client redirection link 156 may cause second content viewing portion 160 to load a first view of second dynamic packet set 140 upon activation, for instance as illustrated in FIG. 3. In some embodiments, client-side module 144 configures remote device 124, for instance by configuring client program 136, to embed an event handler and/or event listener in first client redirection link 128 to produce modified first client redirection link 156; event listener and/or event handler may trigger programming such as scripting or an executable client-side program to create second content viewing portion 160 and load second dynamic packet set 140 in second content viewing portion using URL or other data from first client redirection link 128. Alternatively or additionally, modification of first client redirection link 128 may involve creating an event handler or event listener that is not embedded in first client redirection link 128, but is capable of reacting to activation of first client redirection link 128 similarly to an event handler or listener directly embedded in modified first client redirection link 156; generally, any modification to first client redirection link 128 causing its activation to create second content viewing portion 160 may be considered creation of modified first client redirection link 156 as used herein. Second content viewing portion 160 may be implemented, as a non-limiting example, using a frame or iframe. For instance, third-content viewing portion 154 may be created as an iframe occupying substantially all of display window 132 that is not occupied by third content viewing portion 164; in an embodiment, this may create an appearance of a display that is essentially unchanged from continuous application layer 148. Client-side module 144 may cause display of the original URL of the first client redirection link 128 in a status bar of the client program 136, for instance by using HTML5 push architecture.

Figure 4:
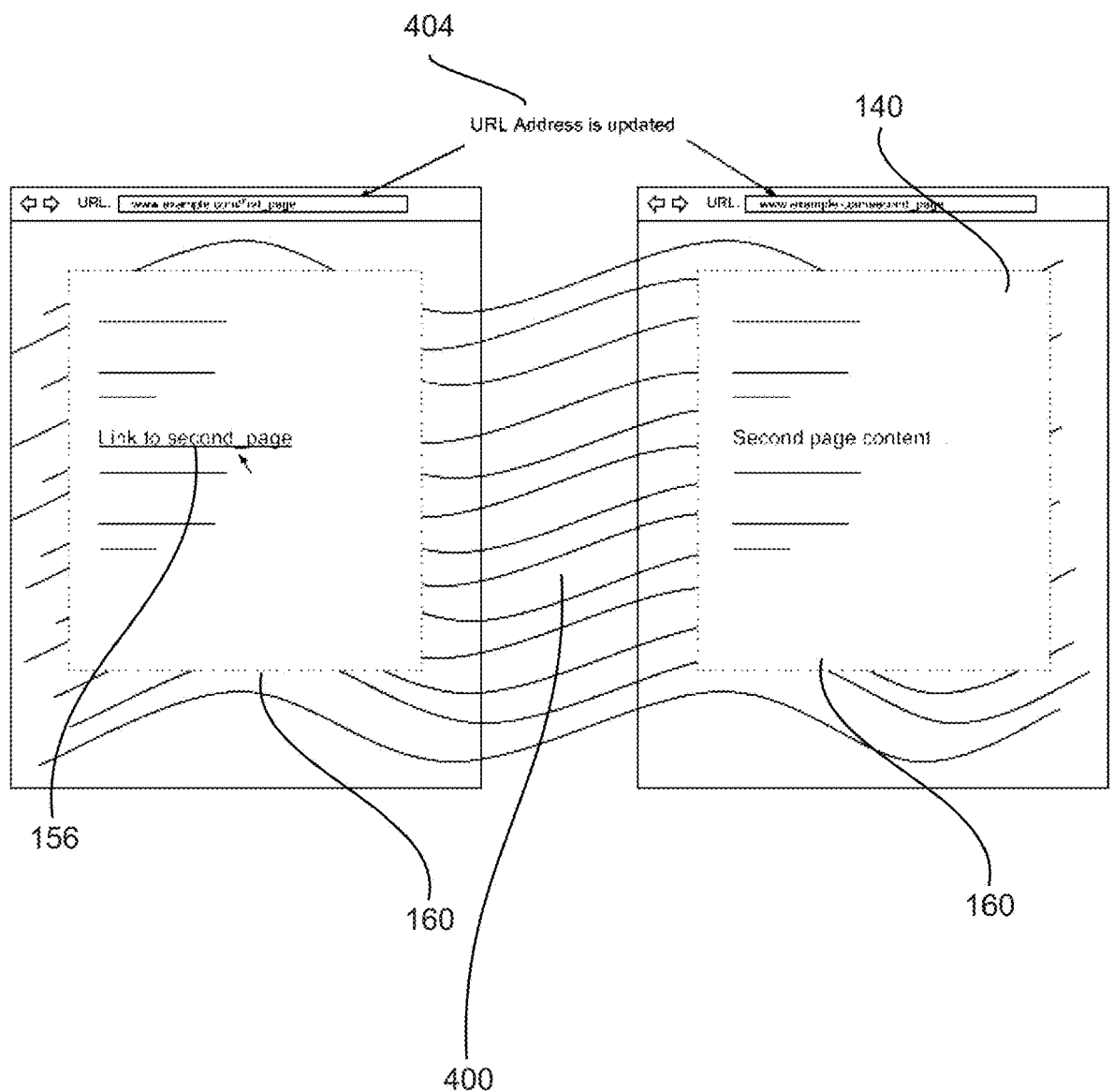
FIG. 4 is a schematic display-flow diagram of an exemplary embodiment of a continuous application layer.

Referring now to FIG. 4, a schematic display-flow diagram of an exemplary embodiment of dynamic packet set 120 containing modified first client redirection link 156 is illustrated. As a non-limiting example, where modified first client redirection link 156 is selected, or otherwise activated, 400 in an out-of-frame mode, and first redirection link 128 was in-domain as described above, client-side module 144 may cause remote device 124 to create second content viewing portion 160, for instance by instantiating a content frame. Remote device 124, as configured by client-side module 144, may remove all contents previously present in first content viewing portion 152, which may for instance be implemented as a traditional web page display, effectively replacing it with second content viewing portion 160. Where a third content viewing portion has been created, for instance as described below in further detail, third content viewing portion may remain after removal of all contents of first content viewing portion 152 and/or creation of second content viewing portion 160. Remote device 124 as reconfigured by client-side module 144 may then load second dynamic packet set 140, which may be a second page of web content such as HTML content, in second content viewing portion 160. Remote device 124 as reconfigured by client-side module 144 may then update the first client redirection link 152 URL bar to the browser URL bar using push state 404. It should be noted that, for links that remote device 124 determines redirect to content not on the server, which may be referred to as out-domain links, remote device 124 may not modify such links, and, as a non-limiting example, permit traditional web page treatment of such links, as described in further detail below. As described in further detail below, when a link is activated in in-frame mode, or in other words after the creation of second content viewing area 160, remote device 124 may similarly check if the link is in-domain, in which case the contents to which the link refers may be loaded in second content viewing area 160; this may be the default behavior for client program 136. Continuing the example, the URL of the link may be updated to a URL bar as before. Where the link is out-domain, remote device 124 as configured by client-side module 144 may cause second content viewing portion 160 and any third content viewing portion as set forth in further detail below to be removed, and load the link in a manner analogous to traditional web browsing.

Still referring to FIG. 4, this implementation may, as a non-limiting example, permit a simple snippet of JavaScript placed at the footer code of a given "traditional website," or similar client-side programming, to create the continuous application layer transforming the traditional website into a more immersive application. Further continuing the non-limiting example, instead of the browser fully refreshing the contents displayed the JavaScript snippet or similar client-side programming may allow any continuous application to run while also providing a new viewport for browsing the website's content. The address bar URL may be kept up to date to reflect the address of the content in view. Further examples for uses of the continuous application layer are illustrated below.

Referring again to FIG. 1, continuous application layer 148 may include a third content viewing portion 164. Client-side module 144 may configure remote device 124 to create third content viewing portion 164 in continuous application layer 148 when initially generating continuous application layer 148; alternatively, client-side module 144 may cause remote device 124 to create third content viewing portion upon the transpiration of an event that initiates display of content in third content viewing portion, as set forth in further detail below. First content viewing portion 152 and third content viewing portion 164 may divide up display window 132 into at least two display regions; each of first content viewing portion 152 and third content viewing portion 164 may function similarly to a view window in its own right. This may be accomplished using HTML 5 iframe technology; as a non-limiting example, third content viewing portion 164 may be implemented as an iframe displaying within first content viewing portion 152, which may be, for instance, a document body displaying in view window. First content viewing portion 152 may display a first view of the first dynamic packet set 120. First view may be rendered using, for instance, web browser or application interpretation and display of first dynamic packet set 120; as a non-limiting example, where first dynamic packet set 120 includes one or more packets containing HTML or similar content, client program 136 may extract such content from the one or more packets and display in first content viewing portion 152.

Still viewing FIG. 1, third content viewing portion 164 may be embedded in first content viewing portion 152, for example without limitation using an iframe. Alternatively, third content viewing portion 164 may be included in a separate content layer from first content viewing portion 152; for example, and without limitation, the first content viewing portion 152 may be displayed in a first layer while the third content viewing portion 164 may be displayed in a second layer. Second layer may be displayed in front of first layer, so that, for instance, third content viewing portion 164 may partially obscure first content viewing portion 152. Content layers may be implemented, as a non-limiting example, using HTML5 Z-index and Canvas properties, which permit display of content layers and control over which content layer is currently displayed. Further examples and illustrations for the use of content layers in system 100 are described below. Third content viewing portion 164 may continue to display upon activation of the modified first client redirection link 156.

With continued reference to FIG. 1, continuous application layer 148 may be used to support numerous applications that act persistently across pages to which users navigate; such applications may be launched or run individually or in combination. As a non-limiting example, client-side module 144 may design and configure remote device 124 to continuously receive quanta transmitted by a first continuous queue transmitter 168. First continuous queue transmitter 168 may be a module that continuously transmits to remote device 124, a plurality of quanta of data. Quanta of the plurality of quanta may originate in a corpus of data. Corpus may be any body of data, including without limitation video or audio data stored in a file for streaming; quanta may be extracted from corpus and placed on a FIFO queue, for instance as described in further detail below, or may be provided by any alternative means. Alternatively or in addition, quanta may be produced and put to a FIFO queue continuously at substantially the same time that quanta are being transmitted by first continuous queue transmitter 168; for instance, quanta may be generated by a video or audio recording device, received at a FIFO queue via the video or audio recording device, and retrieved therefrom and transmitted by first continuous queue transmitter 168. As a non-limiting example, quanta may be generated in a "live streaming" process. Remote device 124 may receive quanta on an additional FIFO queue, for instance, by inserting quanta in a desired or prescribed order into a buffer or the like. Received quanta may be received in a desired or prescribed order or in a different order, such as in duplicate or out-of-sequence form; order may be reasserted by any suitable process for asserting a desired order of quanta.

With continued reference to FIG. 1, quanta may be stored as binary or other data; each quantum of data may be a "packet" or similarly standard-formed datum such as those used in network communication. Each quantum may be a single unit of data to be transmitted, as a non-limiting example, in data streaming protocols such as audio or video streaming. Data represented in quanta 102 may be compressed in any lossy or lossless compression algorithm or combination thereof, for instance as described further below. Plurality of quanta may include duplicate quanta by copying one or more quanta, for example to permit easier error detection and/or correction. Similarly, encoding of data in a quantum, or in all the quanta, may be modified to permit error detection and/or correction. Quanta may be encrypted for secure transmission.

Still referring to FIG. 1, client-side module 144 may design and configure remote device 124 to continuously receive quanta. Continuous reception of quanta, as used herein, indicates loading at a rate that enables reception from first continuous queue transmitter 168, as described in further detail below, at a rate that enables continuous consumption of data presented by the quanta from the perspective of a user; that is, reception of the quanta may permit the user who consumes this data as described below to perceive a video or audio feed being output using the data as essentially without interruption, in a manner analogous to a radio or television broadcast, or to playback from a recording device. Plurality of quanta may be continuously received according to any suitable protocol. As a non-limiting example, client-side module 144 may instantiate on remote device 140 at least an application programmer interface (API) for receiving, processing, and/or displaying continuously transmitted quanta. At least an API may include or interface with one or more media players which may be provided by third parties, examples whereof including without limitation media players included in the YOUTUBE family of products and services provided by Google, Inc. of Mountain View, Calif., the OOYALA family of products and services provided by Ooyala Inc. of Mountain View, Calif., the SOUNDCLOUD family of products and services provided by SoundCloud, Ltd. of Berlin, Germany, and the MEDIAELEMENT family of products and services.

Continuing to view FIG. 1, the third content viewing portion may include a continuous output that continuously inputs received quanta and displays each received quantum at the third content viewing portion, where "each received quantum" means for the purposes used herein each quantum that is non-duplicative and not corrupted by noise or other interference. Continuous display may be implemented using API as described above. Third content viewing portion 164 may function as a "media player," having one or more controls. For example and without limitation, third content viewing portion 164 may include user-interface elements such as "play," "pause," "forward," and "rewind" buttons or the like. Activation of such controls may be performed using any suitable means for activation of any redirection link as described herein. Where quanta represent elements of audio data, third content viewing portion 164 may display only user controls for generation of audio content. Where quanta represent elements of audiovisual data, third content viewing portion 164 may include a display showing video data. Third content viewing portion 164 may remain unchanged when modified first client redirection link 156 is selected; for instance, third content viewing portion 164 may continuously display and continuously output quanta while second content viewing portion 160 is created. Note that second content viewing portion 160 may replace or obscure first content viewing portion 152; this may, for instance, create the appearance that display window 132 has navigated to a new page, without disrupting output of third content viewing portion 164. The result may be that loading the second dynamic packet set 140 in the second viewing portion 160 does not modify the continuous output of the second viewing portion. As a result, continuous media output without the use of pop-up players or dedicated applications may be achieved.

Still referring to FIG. 1, where second content viewing portion 160 is displaying, it may be possible to modify the display of second content viewing portion 160 to view additional views of second dynamic packet set 140. For instance, client-side module 144 may configure remote device 124 to receive an instruction, such as a user instruction, to generate a second view of the second dynamic packet set; for instance, user instruction may include an instruction to scroll or "page down" to a second view, where the second view contains at least one element not visible in the first view. In an embodiment, scrolling occurs in a frame, such as an iframe, instantiating second content viewing portion 160, permitting scrolling within the frame.

With continued reference to FIG. 1, system 100 may include a second continuous queue transmitter 172, operating on the at least a server 104. The second continuous queue transmitter 172 may be implemented in any way suitable for the implementation of first continuous queue transmitter 168. Client module 144 may configure remote device 124 to receive and display quanta transmitted by second continuous queue transmitter 172 in any way suitable for the reception and display of quanta transmitted by first continuous queue transmitter 168.

Still viewing FIG. 1, client-side module 144 may configure remote device to coordinate display of quanta from first continuous queue transmitter 168 and/or second continuous queue transmitter 172 in various ways; coordination may be performed to ensure that only one set of media source is playing at a given time. For instance, client-side module 144 may further configure remote device 124 to receive a terminal quantum of the quanta transmitted by the first continuous queue transmitter 168. A terminal quantum as defined herein is the final quantum transmitted by first continuous queue transmitter 168. Terminal quantum may include a quantum containing information identifying itself as terminal quantum; for instance, terminal quantum may include a packet indicating that a particular set of quanta has ended; remote device 124 may be configured by client-side module 144 to detect the information identifying terminal quantum. Alternatively, remote device 124 as configured by client-side module 144 may detect that terminal quantum is followed by a pause in transmission, from which it may be determined that the set of quanta has terminated. System 100 may also transmit to remote device a playing time corresponding to the quanta transmitted by first continuous queue transmitter 168, permitting remote device 124 as configured by client-side module 144 to determine that continuous display of all quanta up to terminal quanta amounts to a playing time equal to the playing time, indicating that the quanta have terminated.

Continuing to refer to FIG. 1, upon detection of terminal quantum, remote device 124 may be configured by client-side module 144 to continuously receive the quanta transmitted by the second continuous queue transmitter 172 and to display each received quantum of the quanta transmitted by the second continuous queue transmitter 172 in the third content viewing portion 164 after receiving the terminal quantum of the quanta transmitted by the first continuous queue transmitter 168; this may be implemented for instance as described above for the reception and display of quanta transmitted by first continuous queue transmitter 168. This may have the effect of "queueing up" a second stream, such as an audio or video stream, after a first stream, establishing a play order for media presented by system 100.

Still referring to FIG. 1, first dynamic packet set 120 may include a second client redirection link 176. Selection of second client redirection link 176 may direct client program 140 to continuously receive the quanta transmitted by the second continuous queue transmitter 172 and display each received quantum of the quanta transmitted by the second continuous queue transmitter 172 at the display window 132. Client-side module 144 may configure remote device 124 to incorporate quanta from second continuous queue transmitter 172 into continuous application layer 148 upon user selection of a modified second client redirection link 180. Client-side module 144 may configure remote device 124 to identify second client redirection link 176; this identification may be performed using any means or method suitable to detect first client redirection link 128. Client-side module 144 may configure remote device 124 to display modified second client redirection link 180 in the first content viewing portion. As a non-limiting example, modified second client redirection link 180 may cause remote device 124 to halt continuous output in the third content viewing portion 164 of quanta received from first continuous queue transmitter 168. Continuing this example, modified second client redirection link 180 may cause remote device 124 to continuously receive the quanta transmitted by the second continuous queue transmitter 172, and display each received quantum of the quanta transmitted by the second continuous queue transmitter 172 in the third content viewing portion 164; this may be performed according to any means or method described for continuous reception and display of quanta from first continuous queue transmitter 168 as described above.

As a further non-limiting example, and still viewing FIG. 1, client-side module 144 may configure remote device 124 to create the modified second client redirection link 180 so that the modified second client redirection link causes the remote device 124 to receive a terminal quantum of the quanta transmitted by the first continuous queue transmitter; this may be performed as described above for the reception of a terminal quantum. Further continuing the example, second client redirection link 304 may cause remote device 124 to display each received quantum of the quanta transmitted by second continuous queue transmitter 172 in third content viewing portion 164 upon receiving the terminal quantum of the quanta transmitted by first continuous queue transmitter 168.

Still viewing FIG. 1, third content viewing portion 164 may not initially display in continuous application layer 148. In an embodiment, client-side program 144 may configure remote device 124 to display third content viewing portion 164 upon activation of modified second client redirection link 180. Third content viewing portion 164 may display when continuous application layer 148 is initialized, but not display any quanta until a triggering event. Triggering event may be user selection of modified second client redirection link.

Continuing to view FIG. 1, first dynamic packet set 120 may include a third client redirection link 184 that directs an entire display window 132 of a client program 136 at the remote device to load a third dynamic packet set upon activation. Third dynamic packet set may be on a third-party device, such as a server, that is not included in at least a server 104. Client-side module 144 may further configure remote device 124 to determine that the third dynamic packet set is not located on the at least a server; this may be done, for instance, by determining that third client redirection link 184 contains a URL directed to a domain name that refers to a device other than the at least a server 104, or the Internet address of that device. Client-side module 144 may further configure remote device 124 to display in the first content viewing portion 152 a modified third client redirection link 188. Generation of modified third client redirection link 188 may be performed similarly to generation of modified first client redirection link 156, for instance by inserting an event handler or event listener. Selection of the modified third client redirection link may cause remote device 124 to halt the continuous output in third content viewing portion 164, remove the first content viewing portion 152, remove the third content viewing portion 164, and load the third dynamic packet set in the display window 132; this may be accomplished by, for instance, causing third dynamic packet set to load in display window 132 in a manner similar to loading a web page in a browser. Third dynamic packet set (not shown) may be generated from an additional corpus (not shown) in a similar manner to the generation of first dynamic packet set 120.

Referring now to FIG. 3, second dynamic packet set 140 may include a fourth client redirection link 192 that directs entire display window 132 of client program 136 at remote device 124 to load a fourth dynamic packet set upon activation of the fourth client redirection link upon activation of the fourth client redirection link 192. Client-side module 144 may further configure remote device 124 to determine that fourth dynamic packet set is not located on the at least a server 104, which may be performed as described above. Client-side module 144 may then configure remote device 124 to display in the second content viewing portion a modified fourth client redirection link 196, formed so that selection of the modified fourth client redirection link 196 causes the remote device 124 to halt the continuous output in the third content viewing portion 164, remove the second content viewing portion 160, remove the third content viewing portion 164, and load the fourth dynamic packet set in the display window 132; this may be accomplished by steps including, for instance, removal of an iframe or other frame device instantiating second content viewing portion 160 and direction of viewing window to replace its entire contents with fourth dynamic packet set, for instance by replacing a top node in a document object model. Alternatively or additionally, modified fourth client redirection link 196 may cause fourth dynamic packet set to load in a separate program from client program 136; that is, a function call may be generated via remote device to a separate program executing on remote device 124. For instance, and without limitation, modified fourth client redirection link may display to the user an option such as opening an "app store" to purchase another program, a virtual store selling digital media files such as music or video files so that a user may purchase a music or video file such as one currently or recently playing as a result of display of quanta as described herein, an alternate program for display of a dynamic packet set, such as a browser or native application for display thereof, or the like.

With continued reference to FIG. 1, remote device 124 as configured by client-side module 144 may alternatively detect that fourth dynamic packet set is located on the at least a server 104; this may be performed as described above regarding first client redirection link 128. Client-side module 144 may then configure remote device 124 to display in the second content viewing portion 160 a modified fourth client redirection link 196, wherein selection of the modified fourth client redirection link 196 causes the remote device 124 to load a view of the fourth dynamic packet set in the second content viewing portion 160; in some embodiments, where second content viewing portion 160 is implemented using an iframe or similar frame element, this may be a default behavior, in which case modified fourth client redirection link 164 may not modify the fourth client redirection link 192, or may use an event handler or event listener that permits the default behavior while performing other tasks.

Figure 5A:
FIGS. 5A-C are schematic diagrams illustrating an exemplary screenshot of a continuous application layer in an embodiment.
Figure 5B:
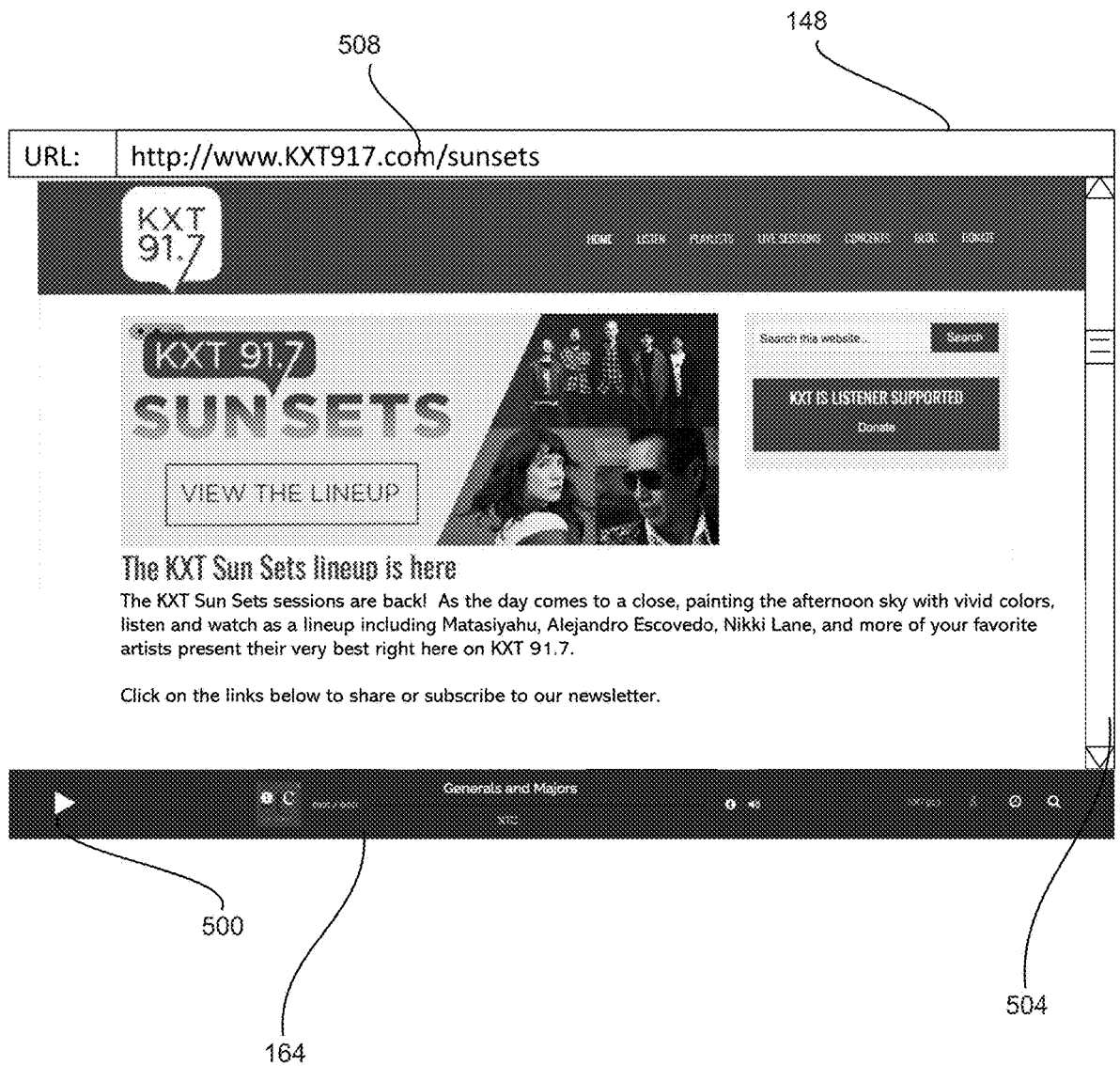
Figure 5C:
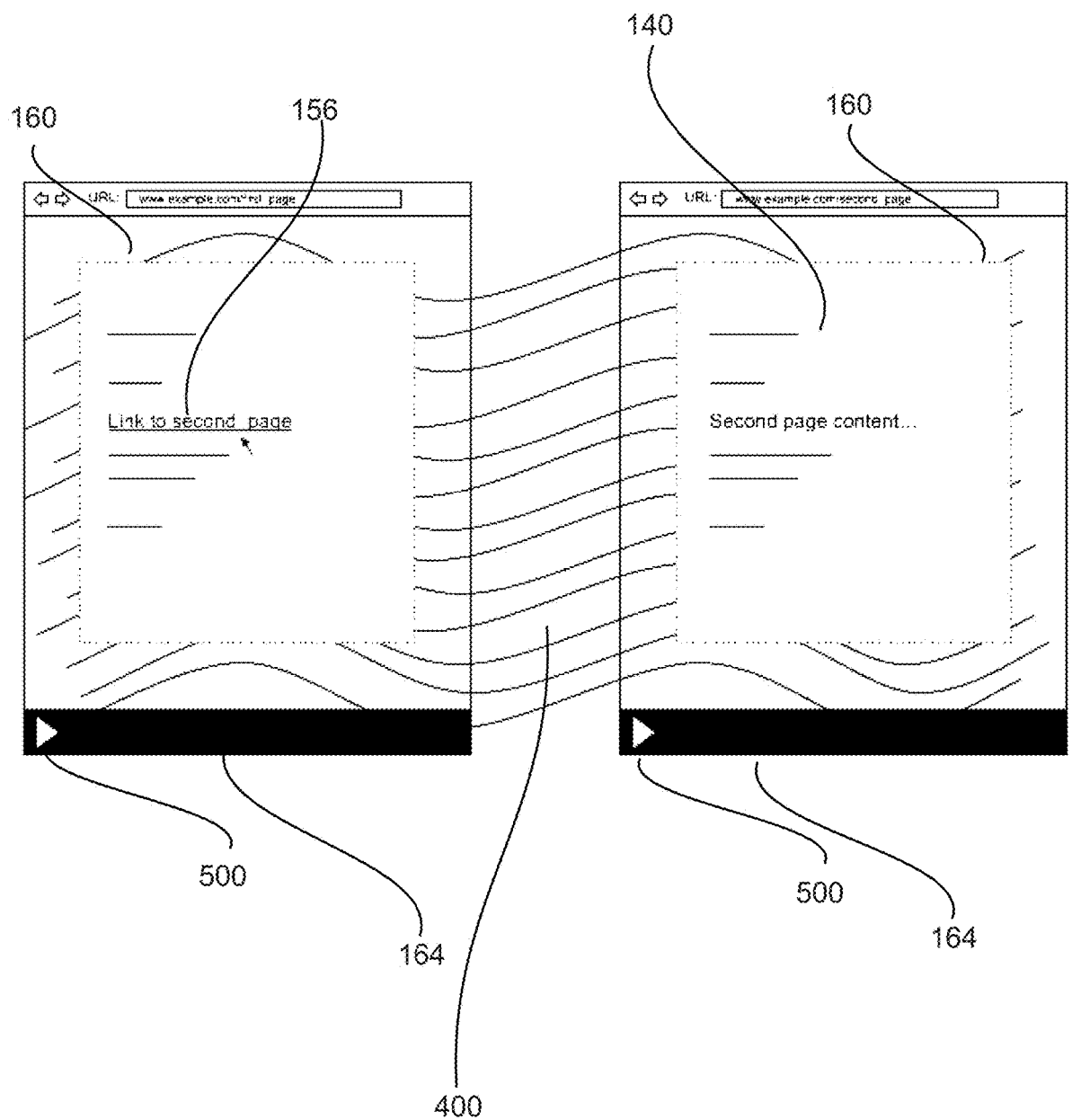

Referring now to FIGS. 5A-C exemplary screenshots illustrating an end-user experience of client program 136 incorporating continuous application layer 148 is illustrated. First content viewing portion 152 may display, for instance content typically associated with a web page, such as images and text. In an embodiment, first content viewing portion 152 may present web content associated with an initial URL to which a user has navigated; client-side module 144 may cause remote device 124 to initialize with first content viewing portion 152 in place. Third content viewing portion 164, where present, may be shown as a media bar with one or more user controls 500, such as a "play/pause" button; third content viewing portion 164 may display audio or video data to user on activation of user control 500, for instance causing speakers or other audio output devices and/or display of remote device 124 to display video or audio content. Third content viewing portion 164 may display initially along with first content viewing portion 152; third content viewing portion 164 may begin to receive and display quanta upon initialization, for instance by receiving audio streaming content pertaining to a musical recording. Continuing the example, a user may be able to pause, play, forward, or rewind musical content, depending on features implemented in third content viewing portion 164.

Continuing to refer to FIGS. 5A-C, modified second client redirection link 180 may permit a user to switch to a different set of streaming content, such as for instance a live stream of audio and/or video content; where video content is included, a video viewing window may open up as described in further detail below. Third content viewing portion 164 may initially be absent and may be initialized by user selection of an additional link or control; for instance, selection of modified second client redirection link 180 may cause third content viewing portion 164 to appear. Third content viewing portion 164 may initially display without initially displaying quanta, such as audio or video streaming content; an event such as selection of modified second client redirection link 180 may cause third content viewing portion 164 to begin displaying quanta, such as quanta associated with a live streaming session.

With continued reference to FIGS. 5A-C, first content viewing portion 152 may include a first view control 504 enabling a user to replace a first view of first dynamic packet set content with a second view, for instance by scrolling down to view additional web content. Where third content viewing portion 164 is embedded in first content viewing portion 152, third content viewing portion may scroll down as well, or may be replaced with a third content viewing portion presented in a separate content layer, for instance as described in further detail below. Where third content viewing portion 164 is in a separate content layer, third content viewing portion may remain in a constant or near-constant location within continuous application layer 148.

Still viewing FIGS. 5A-C, modified first client redirection link 156 may be created by modifying a link directing a user to a page within a website published on server 104; for instance, as a non-limiting example, the modified client redirection link 156 shown in FIG. 5A may modify a link to the URL 508 shown in FIG. 5B. As shown in FIG. 5B, the effect of clicking on modified client redirection link 156 may, in a non-limiting example, be to load the content associated with URL 508 in second content viewing portion 160; second content viewing portion 160 may be displayed in a way that makes it appear to be identical to first content viewing portion 152. For example, and without limitation, second content viewing portion 160 and third content viewing portion 164 may divide up display window 132 between them; where second content viewing portion 160 is implemented using a frame, such as an iframe, second content viewing portion 160 may have a second view control 512 permitting, for instance, a user to scroll or page through content of second dynamic packet set 140. The user experience, therefore, of second content viewing portion 160 may be essentially unchanged from first content viewing portion 152; however, continuous application layer 148 may continue to display in display window 132 after loading second content viewing portion 160, permitting third content viewing portion 164 to continue displaying quanta, such as audio or video streaming content, seamlessly. URL 508 may be updated in a URL bar, for example and without limitation using HTML5 pushState or similar facilities.

As a non-limiting example, a schematic display-flow diagram of an exemplary embodiment of a media player as implemented using continuous application layer 148 is illustrated in FIG. 5C. Third content viewing portion 164 may function as a media player, for instance in the form of a "media bar," that persists when users navigate between pages of a website, as a non-limiting example. In an embodiment, continuous application layer may implement an extremely convenient multimedia player, as it may allow a user to enjoy streaming audio/video content un-interrupted as the user browses the website.

Figure 6:
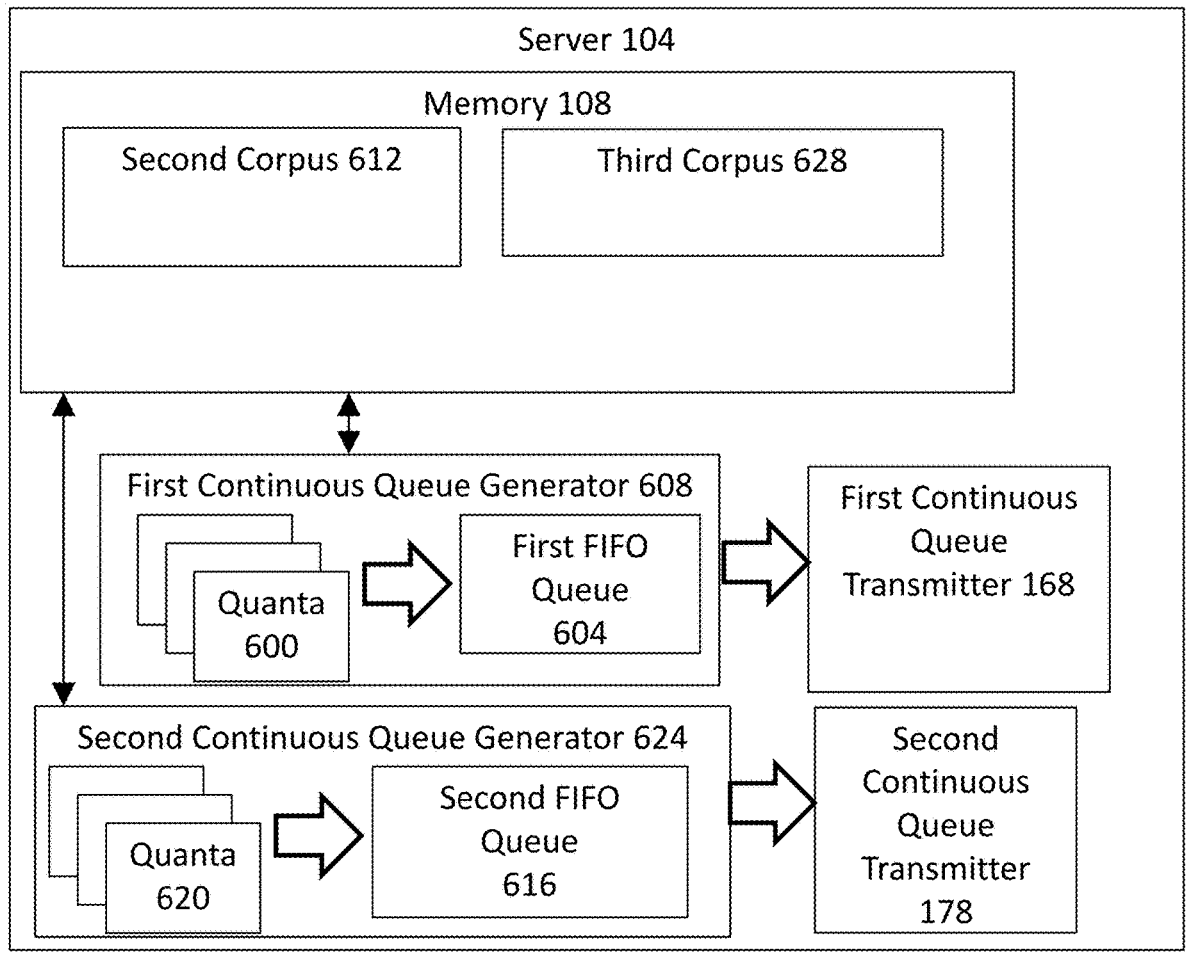
FIG. 6 is a block diagram that illustrates an exemplary embodiment of a server.

Referring now to FIG. 6, an exemplary embodiment of at least a server 104 is illustrated. It should be noted that while for the sake of clarity not all elements that may be present on at least a server 104 are illustrated in FIG. 6, any combination of elements illustrated as included on at least a server 104 in FIGS. 1, 2, and/or 4, or described as included therein in this disclosure, may be present in embodiments as disclosed herein. In an embodiment, first continuous queue transmitter 168 may operate on at least a server 104. First continuous queue transmitter 168 may include any hardware module or logic circuitry. First continuous queue transmitter 168 may be instantiated using one or more commands of computer control logic.

In an embodiment, and with continued reference to FIG. 6, first continuous queue transmitter 168 may be designed and configured to continuously remove quanta 600 from a first FIFO queue 604, where "continuous" is used in the same sense described above in reference to first continuous queue generator 604. First FIFO queue 604 may be implemented using any data structure or hardware that permits FIFO processing of data, including without limitation lists, vectors, arrays, shift registers, or other data structures or hardware, whether named a queue or not. First FIFO queue 604 may be a queue of any length, including the degenerate case of a single-value queue having a value that is removed sufficiently quickly for a subsequent value to be added, for instance in an iterative or parallel process; in other words, first FIFO queue 604 may be any element of digital design or architecture presenting behavior of one or more FIFO queues, including FIFO queues in the degenerate sense, in parallel or series, in the traditional sense both to any other element performing "put" operations and any other element performing "get" operations. Quanta 600 may be stored as binary or other data; each quantum of data may be a "packet" or similarly standard-formed datum such as those used in network communication. Each quantum may be a single unit of data to be transmitted, as a non-limiting example, in data streaming protocols such as audio or video streaming. Data represented in quanta 600 may be compressed in any lossy or lossless compression algorithm or combination thereof. Alternatively or additionally, first continuous queue transmitter 168 may receive and/or transmit data received from a source other than first FIFO queue.

Still referring to FIG. 6, first continuous queue transmitter 168 may be designed and configured to transmit continuously removed quanta 600 over a network to remote device 124. Transmission of continuously removed quanta 600 to the remote device 124 may be continuous in the sense described above. First continuous queue transmitter 168 may modify quanta. For instance, first continuous queue transmitter 168 may compress quanta, either by applying compression to quanta that have not been subjected to compression, or by applying an additional compression algorithm to quanta that have already been compressed to some extent. First continuous queue transmitter 168 may convert quanta 600 to a format required by a network communication protocol to be used in transmitting quanta. First continuous queue transmitter 168 may perform encryption on quanta. Transmission may occur in any order, including order other than the order of retrieval from first FIFO queue, along with duplication or other modification for error correction or other purposes.

Continuing to refer to FIG. 6, system 100 may include a first continuous queue generator 608 operating on the at least a server 104. First continuous queue generator 608 may include any hardware module or logic circuitry. First continuous queue generator 608 may be instantiated using one or more commands of computer control logic. First continuous queue generator 608 may be designed and configured to continuously load quanta 600 of the first plurality of quanta 600 into a first FIFO queue 604. Continuous loading onto first FIFO queue 604, may be continuous as defined above in reference to FIGS. 1-2. Quanta 600 may be stored on first FIFO queue 604 at least temporarily, creating a "buffer," for instance, or similar data storage item, which may aid in the continuous transmission of quanta 600 as described in further detail below.

In an embodiment, and still referring to FIG. 6, first continuous queue generator 608 is designed and configured to convert at least a portion of a second corpus 612 into first plurality of quanta 600. Second corpus 612 may be any form of electronically stored data including without limitation data intended for audio or video output. Second corpus 612 may be stored wholly or in part in memory 108; as an example, second corpus 612 may be stored as a file in memory. File may include an audio data file such as a Motion Picture Experts Group Audio Layer III (MP3) file, a waveform audio (WAV) file, or other file format for digital audio data. File may include a video data file, such as a Motion Picture Experts Group-4 Part 14 (MP4) file or other audiovisual Motion Picture Experts Group (MPEG) file, or other file format for digital audiovisual data. File may include any digital file or set of digital files that may be converted into audio or audiovisual data. Second corpus 612 may be stored wholly or in part in other data structures. As a non-limiting example, second corpus 612 may be wholly or partially stored in a first in first out (FIFO) queue; for instance, and as described in further detail below in reference to FIG. 1C, at least a server 104 may continuously receive data making up second corpus 612 at an input port, which may be stored in an input FIFO queue, and may be continuously removed from the input FIFO queue for further processing as described in further detail below. First continuous queue generator 608 may perform compression on second corpus 612, quanta 600, or both; second corpus 612 or elements thereof may be compressed before provision to first continuous queue generator 608. First continuous queue generator 608 may perform other operations while generating quanta; for instance, continuous queue generator 604 may produce duplicate quanta by copying one or more quanta, for example to permit easier error detection and/or correction. Similarly, continuous queue generator 604 may modify encoding of data in a quantum, or in all the quanta, to permit error detection and/or correction. First continuous queue generator 608 may encrypt quanta for secure transmission.

Still referring to FIG. 6, second continuous queue transmitter 172 may be implemented on at least a server 104; second continuous queue transmitter 172 may include any element suitable for use as an element of first continuous queue transmitter 168. Second continuous queue transmitter 172 may be designed and configured to continuously remove quanta 600 from a second FIFO queue 616; this may be implemented according to any means or method described above for removal of quanta 620 from first FIFO queue 604. Second continuous queue transmitter 172 may be designed and configured to transmit continuously removed quanta 620 over a network to remote device 124. Second continuous queue transmitter 172 may perform any operation or set of operations described above on quanta 620.

With continued reference to FIG. 6, system 100 may include a second continuous queue generator 624; second continuous queue generator 624 may include any element suitable for use as an element of first continuous queue generator 608. Second continuous queue generator 624 may be designed and configured to convert at least a portion of a third corpus of data 628, into the second plurality of quanta 620. Second continuous queue generator 624 may perform any operation or combination of operations on second plurality of quanta 620 that first continuous queue generator 608 may perform on first plurality of quanta 600. Second continuous queue generator 624 may be designed and configured to continuously load quanta 620 of the first plurality of quanta 42 into a second in first out FIFO queue 616; this may be implemented according to any method or means for loading quanta 600 onto first FIFO queue 604 as described above.

Still viewing FIG. 6, client-side module 144 may further configure remote device 124 to incorporate quanta from a third-party source in continuous application layer 148. For example, first continuous queue transmitter 168 may not operate on at least a server 104; client-side module 144 may configure remote device 124 to continuously receive quanta transmitted by first continuous queue transmitter 168. Similarly, second continuous queue transmitter 172 may not operate on at least a server 104. As a non-limiting example, therefore, embodiments of client-side module 144 may configure remote device 124 to include any combination of streaming from server 100 and from third-party sites to be presented via third content viewing portion 164.

Figure 7:
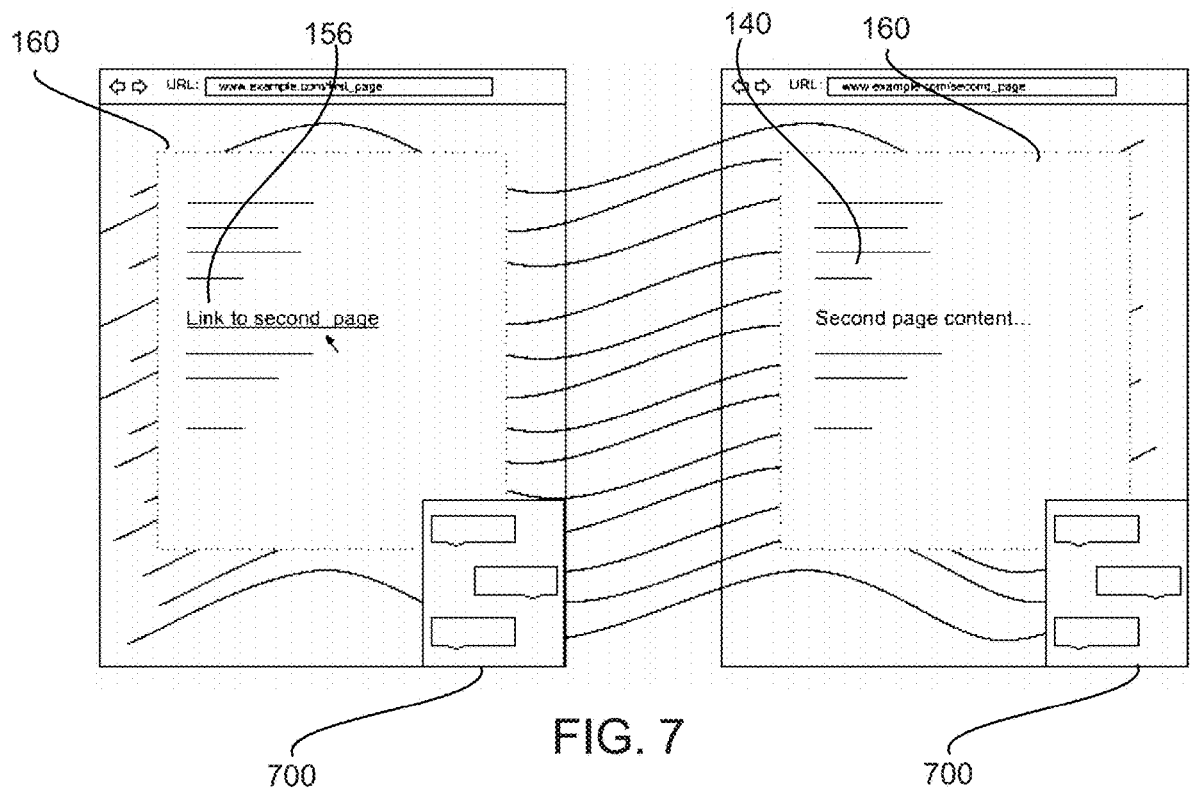
FIG. 7 is a schematic display-flow diagram of an exemplary embodiment of a chat application rendered on a continuous application layer.

Referring now to FIG. 7, a schematic display-flow diagram of an exemplary embodiment of a chat application 700 as implemented using continuous application layer 148 is illustrated. Chat application 700 may be any application permitting a remote device 124, for instance in response to user commands entering textual data to communicate with an additional remote device (not shown) by posting text that is visible at least at one device and receiving text posted by the additional device; as a non-limiting example, chat application 700 may be utilized by a customer service help desk assisting the user as the user browses a website. Chat application 700 may be implemented in third content viewing portion 164 as described above. Chat application 700 as used herein may include applications permitting a user to communicate textually with a chatbot, or with another user, or to permit two chatbots to communicate with one another.

Figure 8:
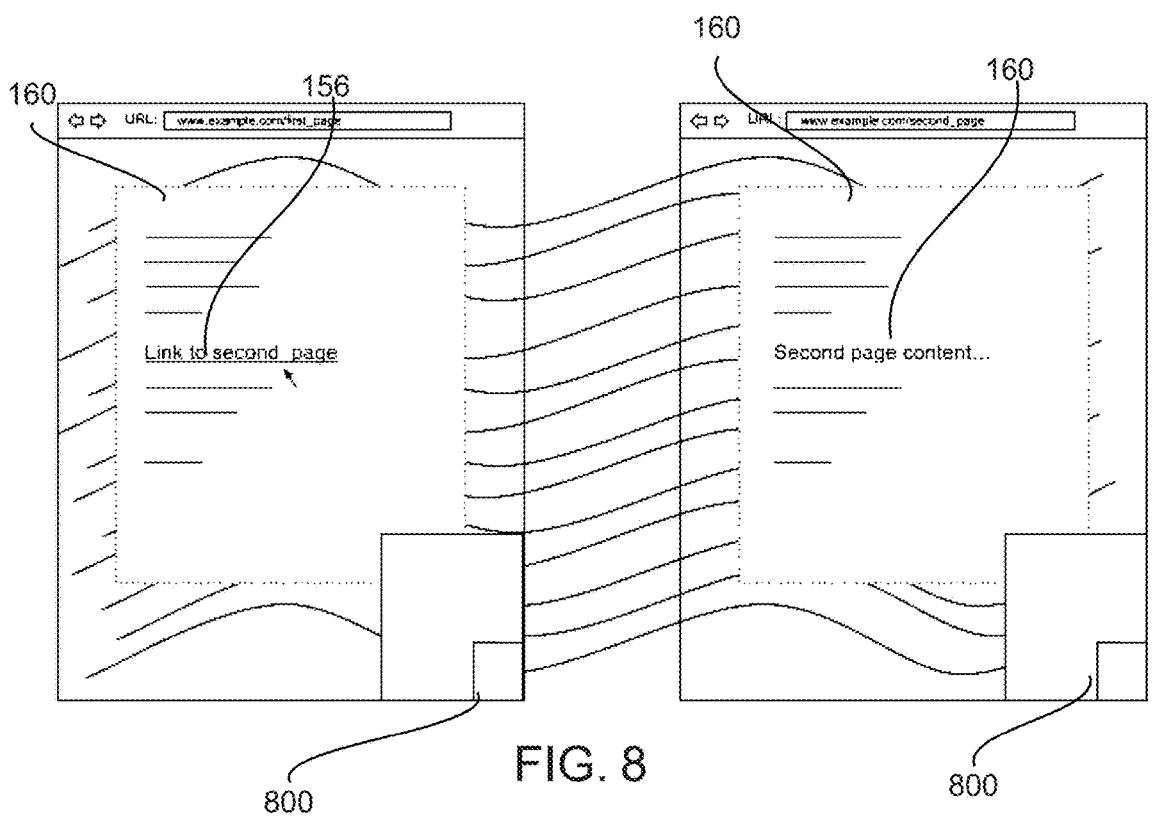
FIG. 8 is a schematic display-flow diagram of an exemplary embodiment of a video chat application rendered on a continuous application layer.

Referring now to FIG. 8, a schematic display-flow diagram of an exemplary embodiment of a video chat application 800 as implemented using continuous application layer 148 is illustrated. Video chat application 800 may be any application permitting a user and/or automated apparatus at remote device 124 to communicate with an additional remote device (not shown) by entering video or audio data, for instance via a "webcam" or similar device that may be visible to a user and/or automated apparatus at the additional device and viewing video or audio data entered by the user of the additional device. Video chat application 800 may be implemented in third content viewing portion 164 as described above and may use continuous queue transmitters and/or related elements to transmit and receive video or audio content. Video chat application 800 may be implemented using video streaming display as described below in reference to FIGS. 9A-C.

Third content viewing portion 164 may also be used to display other data or materials, including static images, text, rendering of a dynamic packet set as described above, or the like. As a non-limiting example, third content viewing portion 164 may permit a person to read a help file or other referential text while attempting to perform step-by-step interactions with various pages provided on at least a server 104; because third content viewing portion 164 is rendered in continuous application layer 148, navigation from one page to another while following steps may not affect display of the reference file. Persons skilled in the art, upon reading the entirety of this disclosure, will be aware of various ways in which third content viewing portion 164 may be used advantageously to improve user experiences.

Figure 9A:
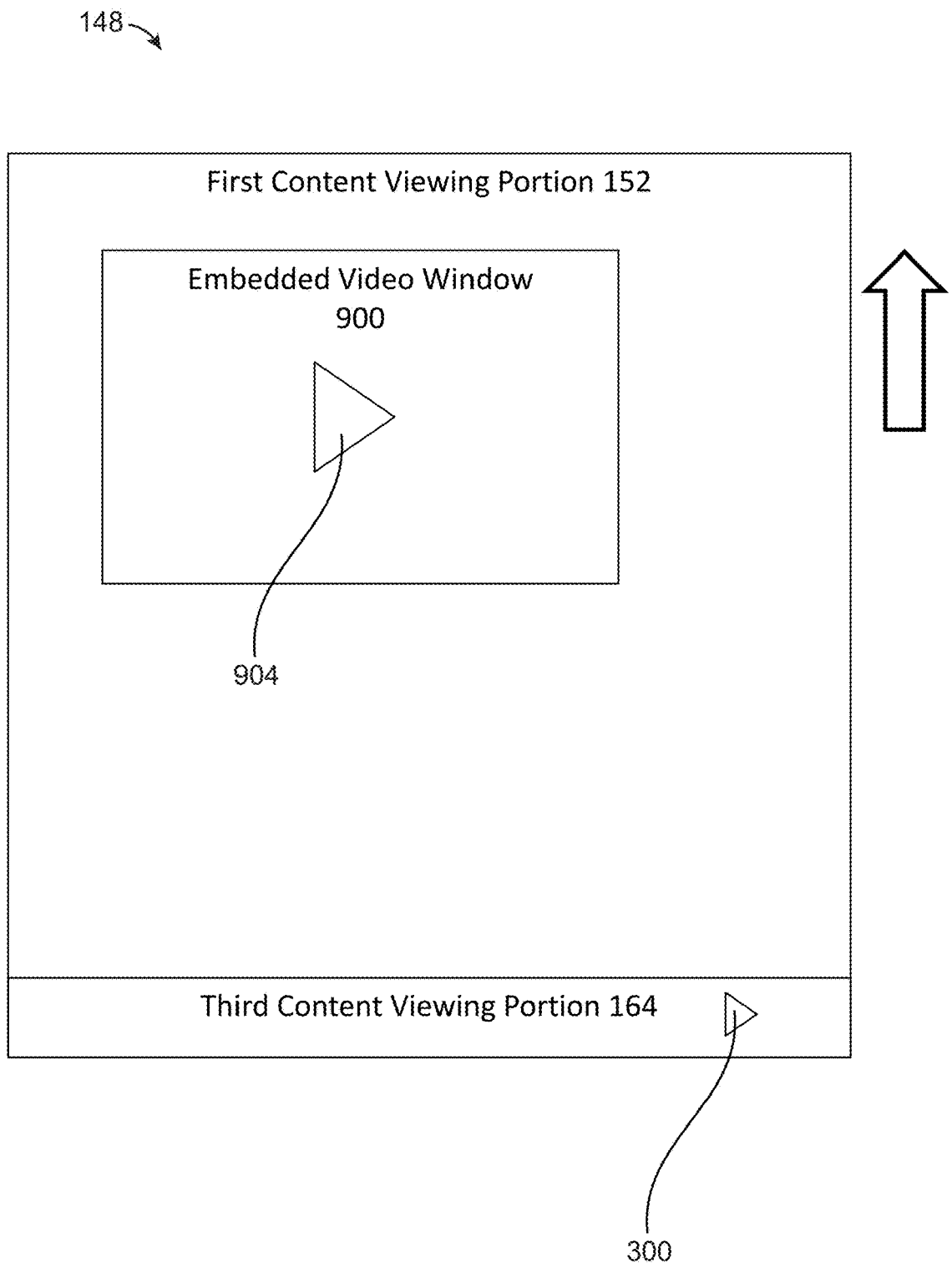
FIGS. 9A-C are schematic screenshots of an exemplary embodiment of a continuous application layer with embedded media player and content layers.
Figure 9B:
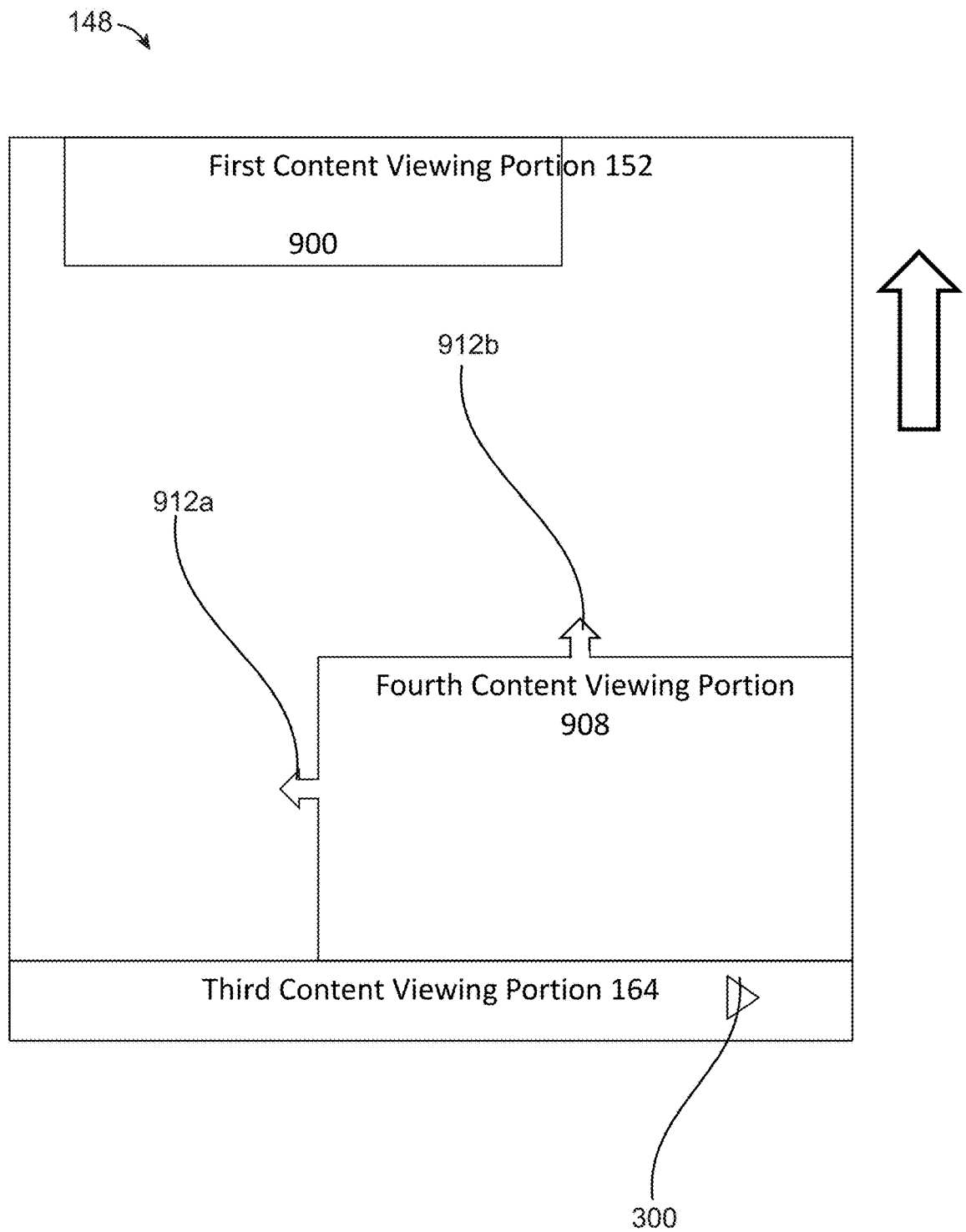
Figure 9C:
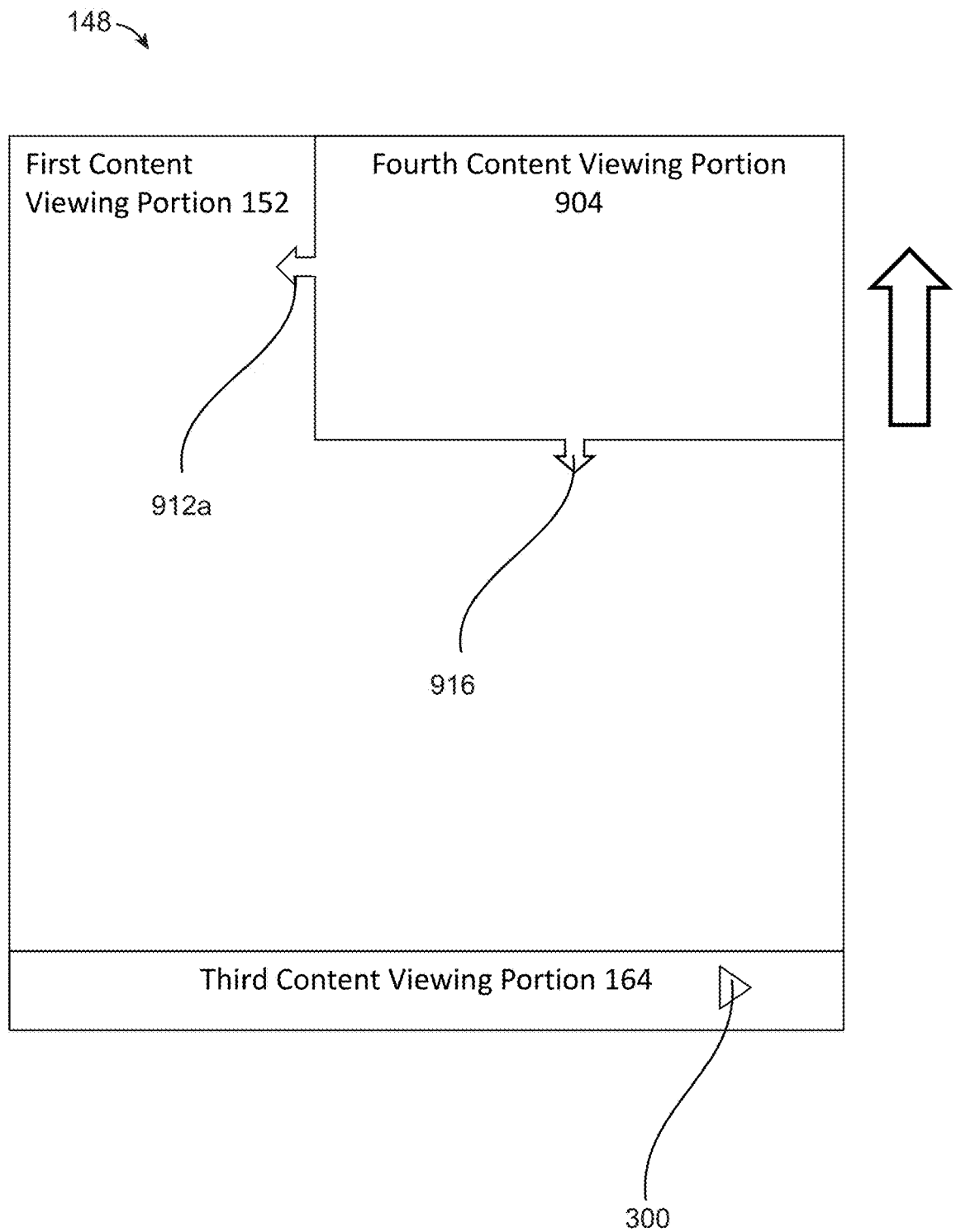

Referring now to FIGS. 9A-C, a use of continuous application layer 146 for video streaming is illustrated. In an embodiment, an embedded video window 900 is included in first content viewing portion 152. Embedded video window 900 may include at least a control 904 that enables display of quanta, such as quanta transmitted by first continuous queue transmitter 168, containing video data; for instance, and without limitation, streaming video data may be displayed in embedded video window 900. Client-side module 144 may configure remote device 124 to modify user controls 500 in third content viewing portion 164 to control play of video data in embedded video window 900, for instance by modifying event handlers of the controls to call functions, routines, or event handlers that control video data in the embedded video window 900. As a non-limiting example, a_video library may scan the page and make a list of video elements on the page. Client-side module may further configure remote device 124 modify at least a control 904 in embedded video window to cause at least a control 904 to become a modified link like modified client redirection link 180; for instance, modified at least a control 904 may cause display of quanta from first continuous queue transmitter in third content viewing portion 164 to halt. Embedded video window 900 may commence playing video and/or audio content as a result; alternatively, embedded video may be configured, either originally or in conjunction with modified link, to begin playing video and/or audio content automatically. Persons skilled in the art will be aware, after reading the entirety of this disclosure, that additional links presented in first content viewing area 152 and/or second content viewing area may be modified to halt video and/or audio content displayed in embedded video window 900 and to display other quanta, either in third content viewing area 164 or in other locations. Persons skilled in the art will also be aware, upon reading the entirety of this disclosure, that embedded video player 900 may be embedded in second content viewing portion 160.

Continuing to view FIGS. 9A-C, embedded video window 900 may be displayed, as a non-limiting example, in a first content layer, such as a content layer containing first content viewing portion 152, or in a second content viewing layer, such as a content layer containing third content viewing portion 164 or an additional content layer. In an embodiment, client-side module 144 may configure remote device 124 to duplicate embedded video 900 in second content layer, overlaying an embedded video originally present in first content viewing portion 152; the latter may be replaced with a dummy section, which may display nothing. Thus, each video may be recreated on the top of website content (either in-frame or out-of-frame) and the videos in the website is replaced by a place holder. When a video is in view (e.g. not scrolled out of the browser view), the position of the video may be synchronized with its placeholder so that the video lies directly on top of its placeholder. As a non-limiting example, dummy placeholder may have one or more similar CSS properties to the original video element. Each video may be recreated on top of the web page (i.e. in second content layer); where page is in-frame, that is, where second content viewing portion 160 has not yet been created, the recreated videos may be create in the same frame as the web page, while when second content viewing portion 160 has been created, videos may be created in second content viewing portion 160. Synchronization of created videos with dummy placeholders may be performed using event handlers. For instance, client-side module 144 may configure remote device 124 to create a scroll event listener on the page; where placeholder is in view upon triggering scroll event, the recreated video's position may be updated to match that of dummy placeholder. Where placeholder is scrolling off the page, video may be recreated at a different location in display as described below. Search for video content may be performed a second time upon user navigation to a different page in-domain. A check may be performed to see if a currently playing video exists in the list of videos on the different page; if so, video element for that video may be recreated on top of a dummy window on the additional page as above, to duplicate the experience of that video being. If the video is not in the list of videos on the different page, the video may continue playing in another position as described below.

A user may enter an instruction causing remote device to display a modified view in first content viewing portion; remote device 124 as configured by client-side module 144 may cause embedded video 900 in second content layer to move in parallel with dummy section, so that embedded video 900 appears to scroll with first content viewing portion 152 as if embedded therein. Where user causes embedded video window 900 to become at least partially obscured, for instance, where the user scrolls down causing embedded video 900 to move upwards out of first content viewing portion, remote device 124 may cause embedded video 900 to relocate in second content layer. In other words, when the placeholder is out of view (e.g. due to scrolling or an in-domain page change), the video, if currently playing, will be placed in a static position on the page. Often, the position is on one of the corners so the website can be viewed while the video continuously plays. In an embodiment, when embedded video 900 is leaving first content viewing portion 152, client-side module 144 may design and configure remote device 124 to create in second content layer a fourth content viewing portion 908; second content layer may display in front of first content layer. In an embodiment, embedded video window 900 may cease continuous display of quanta; the embedded video window 900 may be replaced with a blank "dummy" content viewing portion (not shown) that displays no quanta of video. Remote device 124 may be configured by client-side module 144 to include in fourth content viewing portion 908 a continuous output that continuously inputs the received quanta and displays each received quantum at a display of the remote device; thus, as a non-limiting example, fourth content viewing portion 908 may begin to display quanta of a plurality of quanta that were displaying in embedded video window 900. Continuous output may be implemented as described above for third content viewing portion 164; continuous output may begin outputting at substantially the same time that continuous output at third content viewing portion 164 ceases, with the result that introduction of content layer 500 produces little to no noticeable effect for an end-user viewing display window 132.

As illustrated for example in FIGS. 9B-C, client-side module 144 may further configure remote device 124 to move fourth content viewing portion 908 from a first location (as illustrated in FIG. 9C) within viewing window 138 to a second location (as illustrated in FIG. 9D) within the viewing window 138. Movement may be instantaneous; for instance, content layer 900 may be regenerated with fourth content viewing portion 908 in the new location. Alternatively, movement may be animated, showing fourth content viewing portion 908 in a series of instantaneous steps progressing from its first position to its second position. This movement may be performed automatedly; for instance, client-side module 144 may detect that content to be displayed in second view of first dynamic packet set 120 may be obscured by fourth content viewing portion 908 in its original position, and may move fourth content viewing portion 908 to the new position. Client-side module 144 may alternatively or additionally configure remote device to move fourth content viewing portion 908 in response to a user command. As a non-limiting example, remote device 124 may be configured by client-side module 144 to receive a command from a user to move fourth content viewing portion 908 from a first location in the display window 132 to a second location in the display window 132. Command may include entry by selection of fourth content viewing portion 908 using a locator such as a mouse, or by selection of fourth content viewing portion 908 on a touch-screen; event listeners or event handlers may detect selection of fourth content viewing portion 908. Similarly, command may include entry of a second location to which user wishes to move fourth content viewing portion 908, for instance by "dragging" a mouse cursor, or finger on a touchscreen, to the desired location, or alternatively by tapping the desired location with a finger or mouse cursor. Remote device 124 may then be configured by client-side module 144 to move fourth content viewing portion 908 to new location as described above.

Alternatively or additionally, and still referring to FIGS. 9A-C, client-side module 144 may configure remote device 124 to display at least a movement control 912a-b; at least a movement control 912a-b may be configured to receive a user command to move fourth content viewing portion 908 from the first location to the second location. As a non-limiting example, at least a movement control 912a-b may be configured to move fourth content viewing portion 908 to a particular second location upon activation using a mouse or similar locating device; at least a movement control 912a-b may include a directional indicator, such as without limitation an arrow, informing the user of the direction of motion from the first location to the second location. A first movement control 912a of the at least a movement control may cause fourth content viewing portion 908 to move to a second location; first movement control 912a may include a directional indicator indicating second location. A second movement control 912b of the at least a movement control may cause fourth content viewing portion 908 to move to a third location; first movement control 912a may include a directional indicator indicating third location. After movement of the fourth content viewing portion 908 to the second or third location, an additional movement control 916 may be generated. Additional movement control may cause fourth content viewing portion 908 to move back to the first location; additional movement control 916 may include a directional indicator indicating first location. First, second, and third locations, and additional locations to which fourth content viewing area 908 may be moved as described herein, may include any locations within display window 132, including without limitation one or more corners of display window 132, one or more midpoints of edges of display window 132, one or more corners of first content viewing area 152, one or more midpoints of edges of first content viewing area 152, one or more corners of second content viewing area 160, one or more midpoints of edges of second content viewing area 160, or the like.

Figure 10:
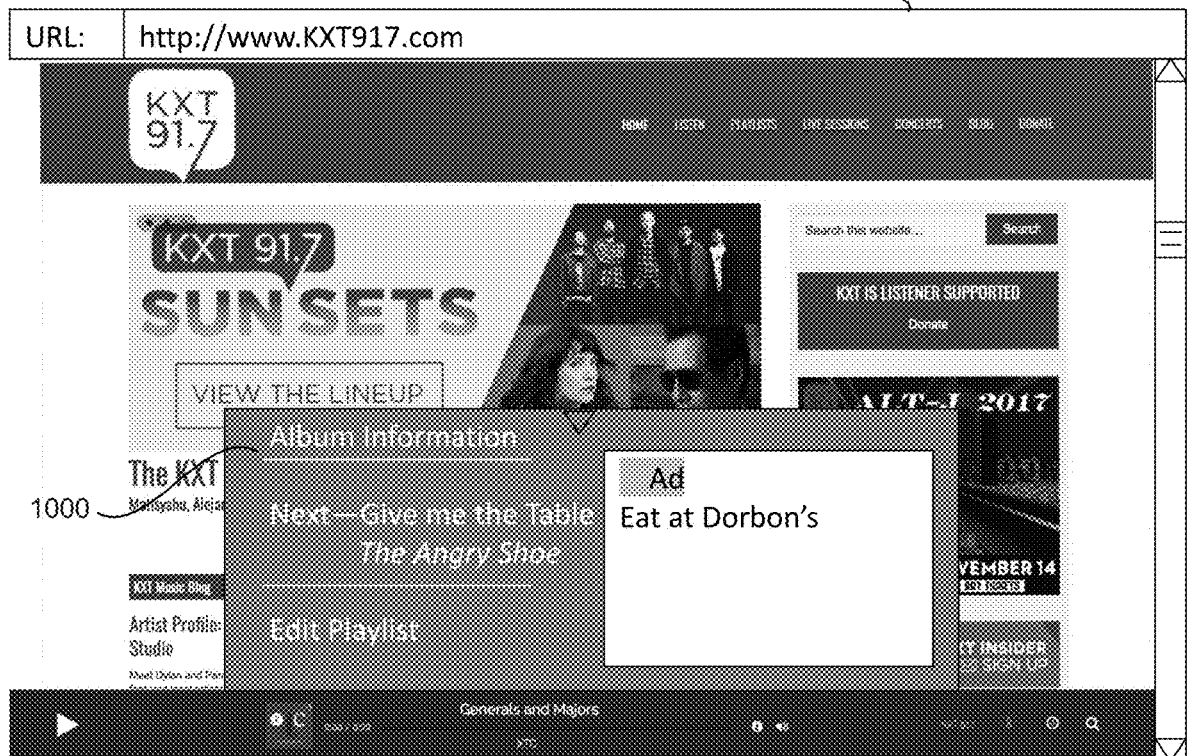
FIG. 10 is a schematic diagram illustrating an exemplary screenshot of a continuous application layer in an embodiment.

Referring now to FIG. 10, third content viewing portion 164 may include an extension 1000. For instance, third content viewing portion 164 may have a first state in which the third content viewing portion 164 has a first area, and a second state in which third content viewing portion has a second area, the second area greater than the first area. Third content viewing portion 164 in the second state may include a first section 1004 containing the area of the original third content viewing portion 164 and a second section containing extension 1000. Extension 1000 may be used to display additional information; for instance, extension 1000 may display textual information describing the plurality of quanta currently being displayed by third content viewing portion 164. Textual information may include, for instance, information concerning a song, such as track listing of an album, playlist information, author, musician or other information. Extension 1000 may be used to display advertisements. Extension 1000 may contain fourth content viewing portion 908.

It should be noted that in some embodiments, a media file (not shown) is transmitted to remote device 124 instead of or in addition to quanta transmitted by first continuous queue transmitter 168; for instance, in third content viewing portion 164 remote device 124 may be configured by client-side module 144 to perform any processes described above for continuous queue generator 604, and to continuously display quanta as before by receiving from a FIFO queue instantiated on remote device 124. Continuous display may commence while portions of media file are still being received by remote device 124. Furthermore, remote device 124 may be configured by client-side module 144 to receive quanta from first continuous queue transmitter 168 and store the quanta temporarily or permanently in a local data structure, which may be a FIFO queue, a file, or other suitable data structure.

Figure 11:
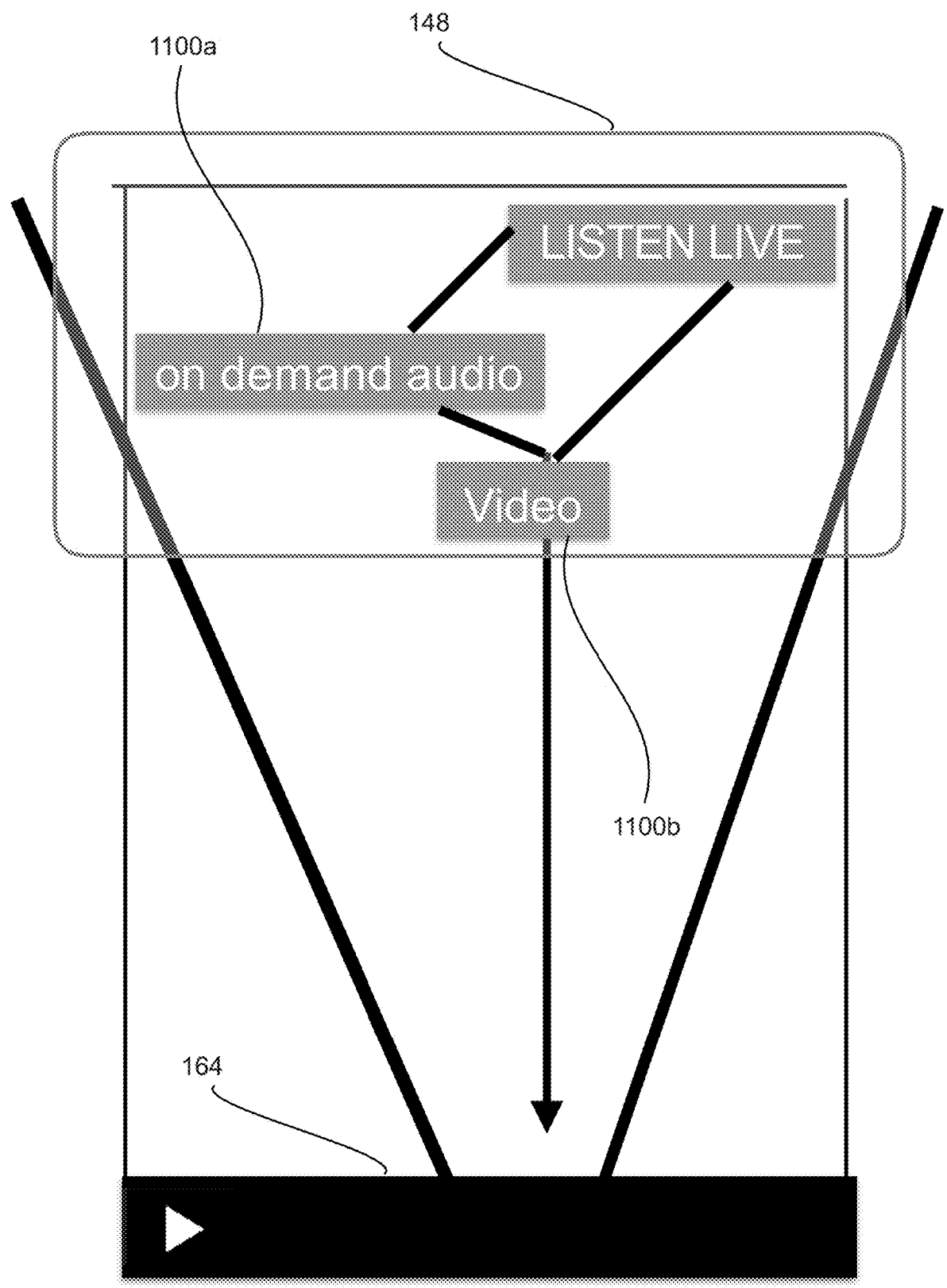
FIG. 11 is a schematic diagram illustrating a continuous application layer in an embodiment.

System 100 implemented as described above may confer various advantages. Referring now to FIG. 11, continuous application layer 148 static view 148 may act to combine various streaming or other media into a single view that coordinates the display of that data and content. Continuous application layer 148 may ensure that only one media source 604*a-b*, such as first continuous queue transmitter 168 or second continuous queue transmitter 172 as described in reference to FIG. 1, plays at a time, where each media source 604*a-b* may be provided as quanta 600 generated by a continuous queue generator as disclosed above. Continuous application layer 148 may further ensure that that media play back is not interrupted during page changes, for instance as described above during user selection of event handlers, or user-directed generation of second view. Continuous application layer 148 may thus eliminate need for a third-party pop-out player. Continuous application layer 148 may makes the site itself the media player; continuous application layer 148 may make third content viewing portion 164 the media player.

Still referring to FIG. 11, client-side module 144 may create continuous application layer in an efficient, easily used, and highly scalable way; for instance, installation of client-side module 144 in a website that contains client redirection links to various dynamic packet sets and continuous queue transmitters as described above may, through the process of parsing and converting the links, rapidly convert the website into one with a media player bar built in, with persistent and controlled media presentation throughout the website. Automated parsing of added or modified links to content or media sources incorporates both in continuous application layer 148. A built-in media player bar implemented by continuous application layer 148 may be responsive and adjust its size to match the dimensions of the devices displaying the web browser.

Since the media controls of the site and content on the site are controlled by continuous application layer 148, the continuous application layer 148 may enable a web browser to have the functionality previously only available with native downloaded Apps. For example, continuous application layer 148 may allow a video while it is playing to be moved up and down the site as the user scrolls the page. The user may also be able to reposition the player while it is playing to rest in any corner of the site. The layer effect may enable the video to travel from page to page across the site, without interruption while the video continues to play. This App-like behavior (specifically the video travel) previously has not been possible in a web browser. Having all the media play functionality controlled by the media player bar in the continuous application layer 148, allows the continuous application layer 148 to regulate which media is playing to ensure no overlap. This may be done by connecting each media source, file or stream URL to connectors available in the continuous application layer 148 and the media player bar.

Additionally, stop start functions of any media may be programmed to match the business or user model of the site owner. For example, if a video ends or user stops the video prior to end, the stream broadcast may automatically be started for the user. As another non-limiting example, the stream broadcast may automatically start when the users first come to the site. The same may be done with a video or on demand audio file. Furthermore, if one media source 1104*a-b* is playing and the user chooses another media source 1104*a-b*, the first media source 1104*a-b* may end and the second may begin. This aggregation of all media functions may enable the site to be the media player, and gives the site owner multiple options to configure how best to present video and audio they curate for the end user, in one place, to be presented across desktop mobile web and native App environments.

Continuous application layer 148 as described may create a simplicity and uniformity in presenting the site, and its media. It also may enable uniformity for ad placement and analytic measurements. Inputs such as video and display advertising may be "input" once and thus sync across desktop, mobile web and App. Similarly, (outputs) analytics such as ad tracking, user interactions, ratings measurements can be exported in aggregate to show total usage and consumption across desktop, mobile web and native App. For example: Video and display advertising, with interactive capabilities, may be placed into the continuous application layer 148 and simultaneously render across desktop, mobile web and App. Using the layered effect, video or display ads may be time released and will follow the user as they change pages on the site. Additional, traditional pre-roll video and site display ads may be placed on the site and sync across desktop, mobile web and App. The continuous application layer 148 may act like a suitcase for the site. Everything may be packed into the continuous application layer 148, and thus the continuous application layer 148 may travel with all the contents and functions seamlessly between desktop browsers, mobile browsers and native downloaded Apps (IOS, Android). Thus, system 100 may enable web applications to evince abilities previously found only in native Apps, to the web environment. This in turn may simplify for the user the ability to play media while interacting with the site. Similarly, system 100 may simplify for the site owner the ability to place media and advertising on the site, sync it to all mobile environments, and measure the usage and interactions as one aggregate user experience.

Paragraphs herein describe in detail how continuous application layer 148 may be created; in an embodiment, and without limitation, when implemented on a site hosted on a web browser, continuation application layer 148 may convert that site into an "web app" giving the site the functionality previously found only in native applications such as IOS or Android apps. Continuous application layer 148 may be formed in the browser environment after one initial click by the end user. Alternatively or additionally, a continuous application layer 148 may be implemented without the need of an initial user click; this may, for instance be used to implement the continuous layer in a IOS, Android and/or other native operating systems. As a result, actions taken in the continuous application layer (the frame) may be enabled to be measured in aggregate across web, native operating systems, and any other applications and/or platforms using one universal measurement system. Embodiments implemented as described herein may enable content to be inserted into web browser and native application environments simultaneously using one central insertion system (CMS).

Figure 12:
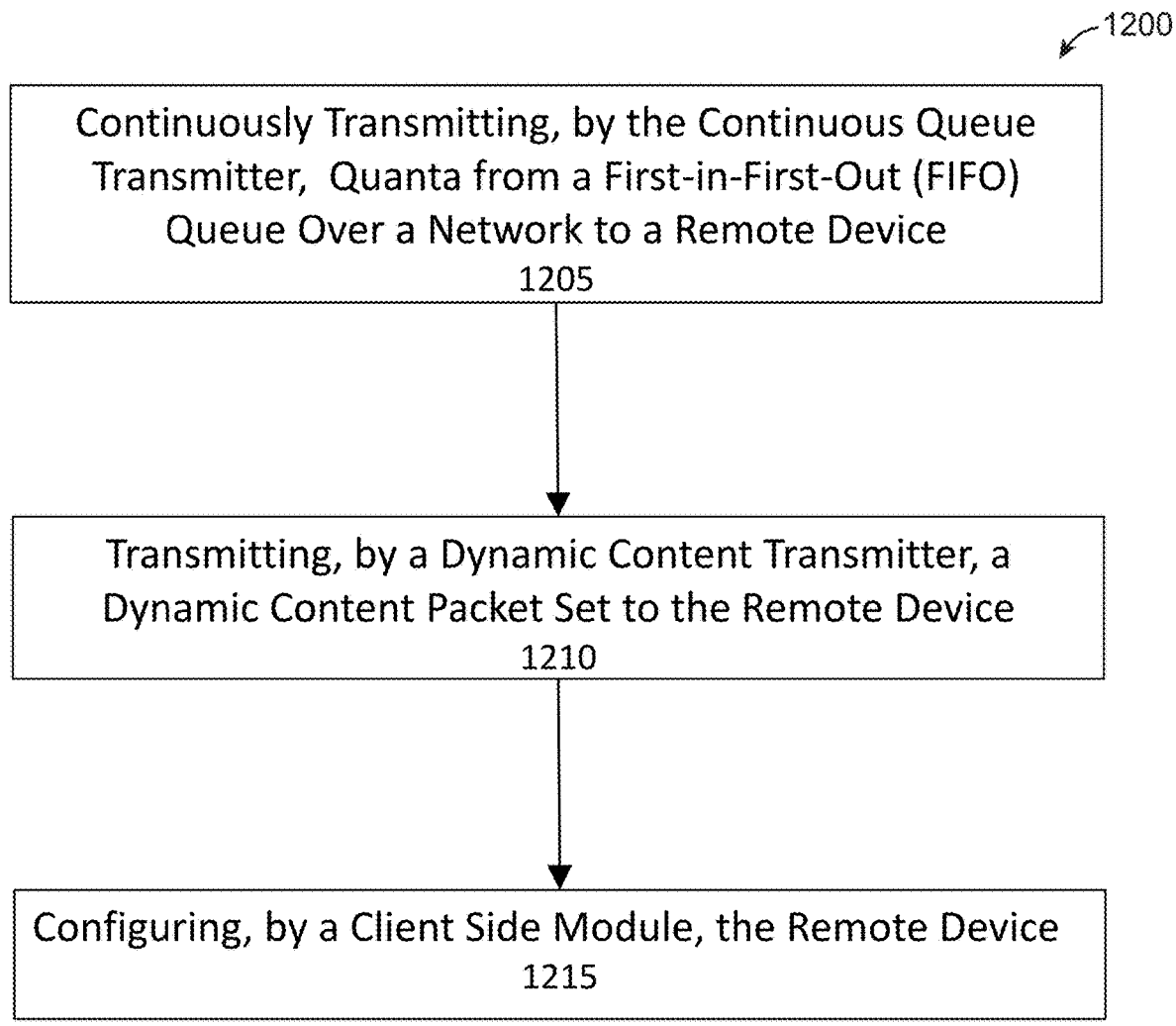
FIG. 12 is flow diagram illustrating an exemplary method of remotely combining dynamic data with a continuous quantum queue.

Referring now to FIG. 12, a method 1200 of remotely combining dynamic data with a continuous quantum queue is illustrated. At step 1205, a first continuous queue transmitter 168 continuously transmits quanta 116 from a first-in-first-out (FIFO) queue over a network to a remote device 124; this may be implemented as described above in reference to FIG. 1. Steps to transmit quanta 116 may include, for instance, converting, by a first continuous queue generator 608 operating on at least a server 104, at least a portion of a second corpus 612 into a first plurality of quanta 116. Steps may include continuously loading, by the first continuous queue generator 608, quanta 116 of the first plurality of quanta 116 into a first in first out (FIFO) queue 118. Steps may include continuously removing, by a first continuous queue transmitter 168 operating on the at least a server 104, quanta 116 from the FIFO queue 118.

At step 1210, and still viewing FIG. 12, a dynamic content transmitter 114 transmits a first dynamic packet set 120 to remote device 124. This may be implemented for example as described above in reference to FIG. 1. First dynamic packet set may include at least a first portion of at least a first corpus 112 and a client redirection link 136 that directs an entire display window 132 of a client program 136 at the remote device 124 to load a second dynamic packet set upon activation.

At step 1215, and still referring to FIG. 12, client-side module 122 configures the remote device 124. Client-side module 122 configures remote device 124 to receive the first dynamic content packet set 134 at the remote device, parse the first dynamic content packet set to identify the client redirection link 136, determine that the second dynamic packet set 140 is located at the at least a server 104, continuously receive quanta of the continuously transmitted quanta, and generate a continuous application layer 148 in the display window 132. The continuous application layer 148 may include a first content viewing portion 152 displaying a first view of the dynamic content packet set 134 at a display of the remote device, a modified client redirection link 152 that causes the remote device to create a second content viewing portion 160 and to load the second dynamic packet set 140 in the second content viewing portion 160 upon activation, and a third content viewing portion 164 including a continuous output that continuously inputs the received quanta and displays each received quantum in the third content viewing portion 164. This may be implemented for instance as described above in reference to FIGS. 1-3D. Continuous application layer 148 may include a first content viewing portion 152 displaying a first view of the first dynamic packet set at a display of the remote device 124. Continuous application layer 148 may include a third content viewing portion 164 including a continuous output that continuously inputs the received quanta 116 and displays each received quantum at a display of the remote device 124. Alternatively or additionally, continuous application layer 148 may be created as described below in reference to FIG. 14; i.e. second content viewing portion and third content viewing portion may be initially created instead of first content viewing portion.

Figure 13:
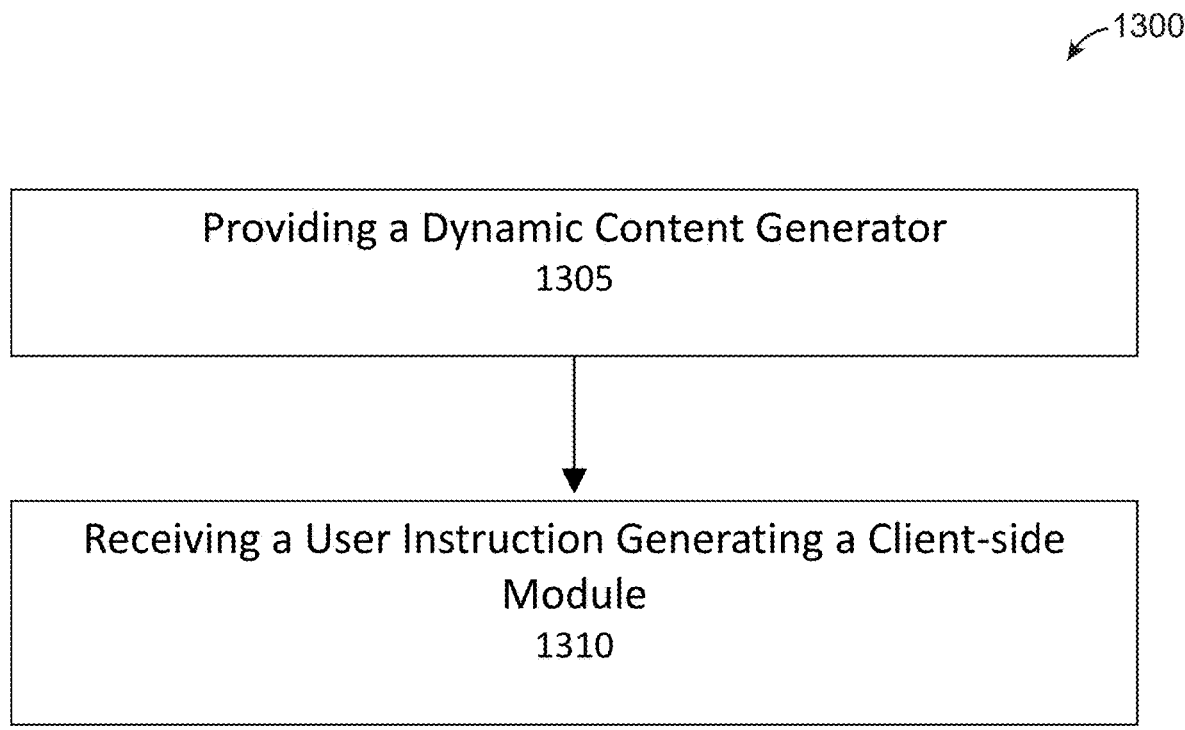
FIG. 13 is a flow diagram illustrating a method for converting a static web page into a web page including streaming content.

FIG. 13 illustrates an exemplary embodiment of a method 1300 of converting static web page to a web page incorporating a media container 300. At step 1305, a dynamic content transmitter 116 is provided; the dynamic content transmitter 116 may be any dynamic content transmitter 116 as described above in reference to FIG. 1.

At step 1310, an instruction is received to create a client-side module 144. Client-side module 144 may be any client-side module 144 as described above in reference to FIG. 1. Instruction may, for instance, embed on each page of website a client-side program in the form of scripting code or a reference to a compiled program that performs steps to instruct remoted device as client-side module 144 instructs remote device 144 as described above.

Method 1300 may have various advantages over existing methods. For instance, attempting a similar conversion using alternate approaches complication installation into the framework of the site, and often is not compatible with other software elements that sites normally use. Thus, the such techniques require a high level of software development and time to implement and update. In contrast, method 1300 enables non-technical site owners a way to solve many long-standing problems using a simple process aided by the automated parsing and transformation described above. The Continuous application layer 148's one-size-fits-all approach to serving and measuring content, simplifies the user experience and the site owners operational experience.

Figure 14:
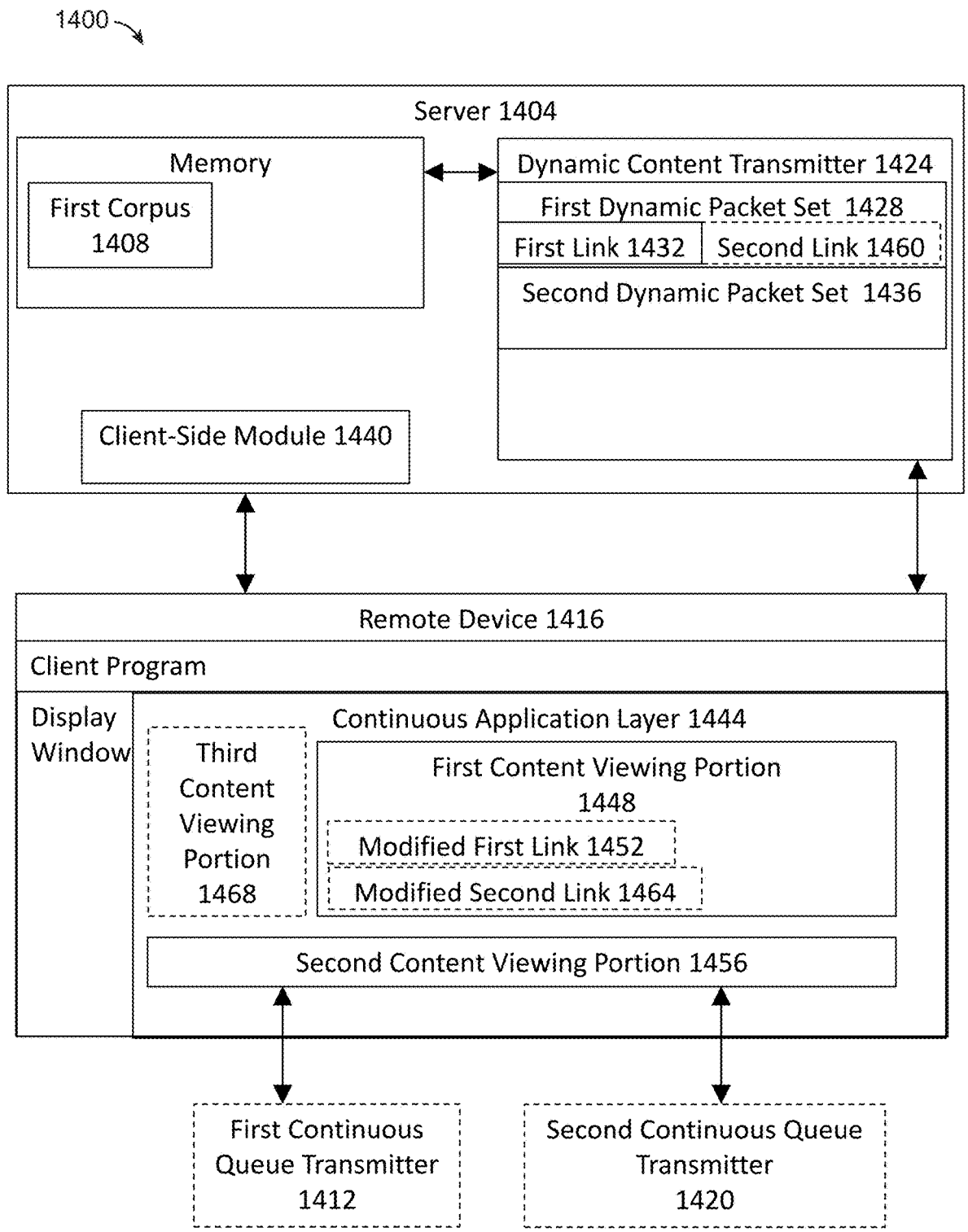
FIG. 14 is a block diagram illustrating an exemplary system in an embodiment.

Referring now to FIG. 14, a platform-agnostic thick-client system 1400 for combined delivery of disparate streaming content and dynamic content by combining dynamic data with output from a continuous queue transmitter is disclosed. System 1400 includes at least a server 1404. At least a server 1404 may be any server as described above in reference to FIGS. 1-13. At least a server 1404 may be designed and configured to provide a first corpus of data 1408; first corpus of data 1408 may include anything suitable for use as first corpus of data 112 above in reference to FIGS. 1-13.

In an embodiment, and still referring to FIG. 14, a first continuous queue transmitter 1412 may operate on the at least a server 1404, for instance as described above in reference to FIG. 6; first continuous queue transmitter 1412 may include anything suitable for use as a first continuous queue transmitter 168 as described above in reference to FIGS. 1-13. First continuous queue transmitter 1412 may be designed and configured to continuously remove quanta from a first FIFO queue, for instance as described above in reference to FIGS. 1-13. First continuous queue transmitter 1412 alternatively may not operate on at least a server 1404. First continuous queue transmitter 1412 may be designed and configured to transmit the continuously removed quanta over a network to a remote device 1416 (which may be any remote device 124 as described above in reference to FIGS. 1-13), which may be accomplished according to any means or methods as described above in reference to FIGS. 1-13. At least a server 1404 may include a second corpus of data provided at the at least a server 1404, which may include anything suitable for use as a second corpus of data 612 as described above in reference to FIG. 6. At least a server 1404 may include a first continuous queue generator operating on the at least a server 1404. First continuous queue generator may include anything suitable for use as first continuous queue generator 608 as described above in reference to FIG. 6. For example, and without limitation, first continuous queue generator may be designed and configured to convert at least a portion of second corpus into a first plurality of quanta and continuously load quanta of the first plurality of quanta into the FIFO queue. Similarly, a second continuous queue transmitter 1420 may operate on the at least a server 1404; second continuous queue transmitter 1420 may include anything suitable for use as second continuous queue transmitter 1420 as described above in reference to FIGS. 1-13. In an embodiment, second continuous queue transmitter 1420 may be designed and configured to continuously remove quanta from a second FIFO queue and transmit the continuously removed quanta over a network to the remote device 1416; this may be accomplished as described above in reference to FIGS. 1-13.

In an embodiment, and with continued reference to FIG. 14, at least a server 1404 may include a second continuous queue generator operating on the at least a server 1404, which may be anything suitable for use as first continuous queue generator, as described above in reference to FIGS. 1-13. Second continuous queue generator may be configured to convert at least a portion of a second corpus into a second plurality of quanta and continuously load quanta of the second plurality of quanta into the second FIFO queue, which may be implemented as described above in reference to FIGS. 1-13. Alternatively, second continuous queue transmitter 1420 may not operate on at least a server 1404.

Still referring to FIG. 14, system 1400 may include a dynamic content transmitter 1424, which may include any dynamic content transmitter 116 as described above in reference to FIGS. 1-13. For instance, and without limitation, dynamic content transmitter 1424 may be configured to generate a first dynamic packet set 1428 that combines at least first a portion of the first corpus with a first client redirection link 1432 that directs an entire display window of a client program at the remote device 1416 to load a second dynamic packet set 1436 upon activation, and transmit the dynamic content packet set to the remote device 1416. First dynamic packet set 1428 and/or first client redirection link 1432 may be implemented, in a non-limiting example, as described above in reference to FIGS. 1-13.

With continued reference to FIG. 14, system 1400 may include a client-side module 1440 operating on at least a server 1404. Client-side module 1440 may include anything suitable for use as client-side module 144 as described above in reference to FIGS. 1-13. Client-side module 1440 may design and configure remote device 1416 using any means or methods described above for reconfiguration of a remote device 1416 in reference to FIGS. 1-13. For instance, and without limitation, client-side module 1440 may design and configure remote device 1416 to receive first dynamic content packet set at the remote device 1416; this may be implemented as described above in reference to FIGS. 1-13. Client-side module 1440 may design and configure remote device 1416 to parse first dynamic content packet set to identify the first client redirection link 1432, for instance as described above in reference to FIGS. 1-13. Client-side module 1440 may design and configure remote device 1416 to determine that the second dynamic packet set 1436 is located at the at least a server 1404, which may be performed as described above in reference to FIGS. 1-13. Client-side module 1440 may design and configure remote device 1416 to generate a continuous application layer 1444 in the display window according to means and/or methods as described above in reference to FIGS. 1-13; for instance, and without limitation the continuous application layer 1444 may include a first content viewing portion 1448 displaying a first view of the dynamic content packet set at a display of the remote device 1416 and a modified first client redirection link 1452 in the first content viewing portion 1448, the selection of which causes the first content viewing portion 1448 to load a first view of the second dynamic packet set 1436 upon activation. First content viewing portion 1448 may be implemented in any manner suitable for implementing second content-viewing portion as described above in reference to FIGS. 1-13.

Still referring to FIG. 14, client-side module 1440 may design and configure remote device 1416 to include, in continuous application layer 1444, a second content viewing portion 1456. Second content viewing portion 1456 may, as a non-limiting example, be implemented as described above, in reference to FIGS. 1-13, for implementation of third content viewing portion 164. For instance, second content viewing portion 1456 may continue to display upon activation of the modified first client redirection link 1452. As a further non-limiting example, first content viewing portion 1448 may be displayed in a first layer, second content viewing portion 1456 may be displayed in a second layer, and second layer may be displayed in front of the first layer; second content viewing portion 1456 may, for instance, include an extension 1000 as described above in reference to FIG. 10.

In an embodiment, and with continued reference to FIG. 14, client-side module 1440 may design and configure the remote device 1416 to continuously receive quanta transmitted by first continuous queue transmitter 1412; this may be implemented, without limitation, as described above in reference to FIGS. 1-13. Second content viewing portion 1456, as configured by client-side module 1440, may include a continuous output that continuously inputs received quanta and displays each received quantum at the second content viewing portion 1456; this may be implemented according to any means or method described above in reference to FIGS. 1-13. In an embodiment, loading the second dynamic packet set 1436 in the second viewing portion does not modify the continuous output at the second content viewing portion 1456, which may be accomplished, without limitation, as described above in reference to FIGS. 1-13. In an embodiment, and as described in further detail above in reference to FIGS. 1-13, client-side module 1440 may further configure remote device 1416 to continuously receive quanta transmitted by a second continuous queue transmitter 1420.

Still referring to FIG. 14, client-side module 1440 may configure remote device 1416 according to any process or means as described above in reference to FIGS. 1-13 to process input from one or more continuous queue transmitters. For instance, and without limitation, client-side module 1440 may further configure remote device 1416 to receive a terminal quantum of quanta transmitted by the first continuous queue transmitter 1412 display each received quantum of the quanta transmitted by the second continuous queue transmitter 1420 in the second content viewing portion 1456 after receiving the terminal quantum of the quanta transmitted by the first continuous queue transmitter 1412; this may be implemented, without limitation, in any manner as disclosed above in reference to FIGS. 1-13. Similarly, where first dynamic packet set 1428 includes a second client redirection link 1460, selection of the second client redirection link 1460 may direct a client program at the remote device 1416 to continuously receive the quanta transmitted by the second continuous queue transmitter 1420 and display each received quantum of the quanta transmitted by the second continuous queue transmitter 1420 at the viewing window as described above in reference to FIGS. 1-13. In an embodiment, client-side module 1440 may further configure remote device 1416 to identify second client redirection link 1460 and display a modified second client redirection link 1464 in the first content viewing portion 1448 where the modified second client redirection link 1464 causes the remote device 1416 to halt the continuous output in the second content viewing portion 1456 of the quanta received from the first continuous queue transmitter 1412, continuously receive the quanta transmitted by the second continuous queue transmitter 1420, and display each received quantum of the quanta transmitted by the second continuous queue transmitter 1420 in the second content viewing portion 1456. In an embodiment, client-side module 1440 may further configure remote device 1416 to identify the second client redirection link 1460 and display a modified second client redirection link 1464 in the first content viewing portion 1448, where the modified second client redirection link 1464 causes the remote device 1416 to receive a terminal quantum of the quanta transmitted by the first continuous queue transmitter 1412, continuously receive the quanta transmitted by the second continuous queue transmitter 1420, and display each received quantum of the quanta transmitted by the second continuous queue transmitter 1420 in the second content viewing portion 1456 upon receiving the terminal quantum of the quanta transmitted by the first continuous queue transmitter 1412.

In an embodiment, and continuing to refer to FIG. 14, first dynamic packet set 1428 may include a third client redirection link that directs an entire display window of a client program at the remote device 1416 to load a third dynamic packet set upon activation; this may be implemented for instance as described above in reference to FIGS. 1-13. Client-side module 1440 may further configure remote device 1416 to determine that the third dynamic packet set is not located on the at least a server 1404, and display in the first content viewing portion 1448 a modified third client redirection link, wherein selection of the modified third client redirection link causes the remote device 1416 to halt the continuous output in the second content viewing portion 1456, remove the first content viewing portion 1448, remove the second content viewing portion 1456, and load the third dynamic packet set in the display window. This may be performed according to any means or methods described above in reference to FIGS. 1-13.

Still referring to FIG. 14, in an embodiment, second dynamic packet set 1436 may include a fourth client redirection link that directs an entire display window of a client program at the remote device 1416 to load a fourth dynamic packet set upon activation of the fourth client redirection link. In an embodiment, client-side module 1440 may configure remote device 1416 to determine that the fourth dynamic packet set is not located on the at least a server 1404 and display in the first content viewing portion 1448 a modified fourth client redirection link, wherein selection of the modified fourth client redirection link causes the remote device 1416 to halt the continuous output in the second content viewing portion 1456, remove the second content viewing portion 1456, remove the first content viewing portion 1448, and load the third dynamic packet set in the display window, for instance as disclosed above in reference to FIGS. 1-13. Similarly, client-side module 1440 may further configure remote device 1416 to determine that fourth dynamic packet set is located on the at least a server 1404, and display in first content viewing portion 1448 a modified fourth client redirection link, where selection of the modified fourth client redirection link causes the remote device 1416 to load a view of the fourth dynamic packet set in the first content viewing portion 1448; this may be accomplished in an embodiment as described above in reference to FIGS. 1-13. Client-side module 1440 may further configure remote device 1416 to receive an instruction to generate a second view of the second dynamic packet set 1436 and display the second view of the second dynamic packet set 1436 in the second content viewing portion 1456, for instance as described above in reference to FIGS. 1-13.

With continued reference to FIG. 14, client-side module 1440 may further configure remote device 1416 to generate a third content viewing portion 1468; third content viewing portion 1468 may be generated as part of continuous application layer 1444. In other words, continuous application layer 1444 may further include third content viewing portion 1468. Third content viewing portion 1468 may be implemented according to any means or method, and may have any or all attributes, of any of first content viewing portion 152, second content viewing portion 160 and/or third content viewing portion 164 as described above in reference to FIGS. 1-13. Third content viewing portion 1468 may, for instance, display one or more links; one or more links may cause one or more dynamic packet sets to display in first content viewing portion 1448, second content viewing portion 1456, and/or third content viewing portion 1468 upon selection. One or more links may cause first, second, and/or third content portion to display quanta from one or more continuous queue transmitters, and/or to switch from display of quanta from one continuous queue transmitter to quanta from another continuous queue transmitter, according to any process therefor as described above in reference to FIGS. 1-13.

Continuing to view FIG. 14, third content viewing portion 1468 may be included in a separate content layer from first content viewing portion 1448 and/or second content viewing portion 1456; for example, and without limitation, the first content viewing portion 1448 may be displayed in a first layer, the second content viewing portion 1456 may be displayed in a second layer, and the third content viewing portion 1468 may be displayed in a third layer. Second layer may be displayed in front of first layer and/or second layer, so that, for instance, third content viewing portion 1468 may partially obscure first content viewing portion 1448 and/or second viewing portion; any two layers may be identical, and any layer may be in front or behind of any other layer, in alternative or additional embodiments. Content layers may be implemented according to any methodology or means as described above for implementation of content layers. Further examples and illustrations for the use of content layers in system 1400 are described below. Third content viewing portion 1468 may continue to display upon activation of modified first client redirection link 1452.

Figure 15A:
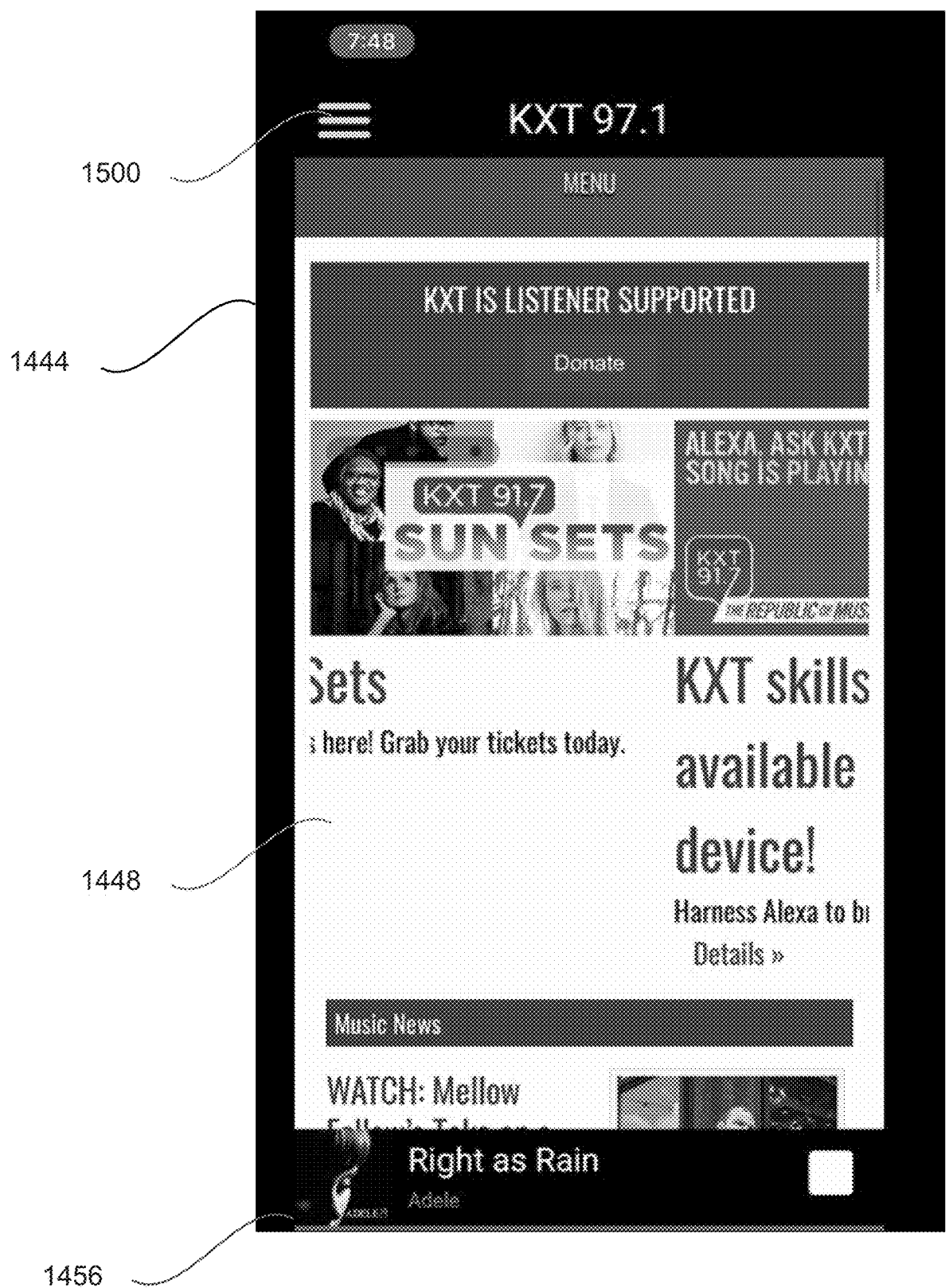
FIGS. 15A-C are schematic diagrams illustrating exemplary screenshots of a continuous application layer in an embodiment.
Figure 15B:
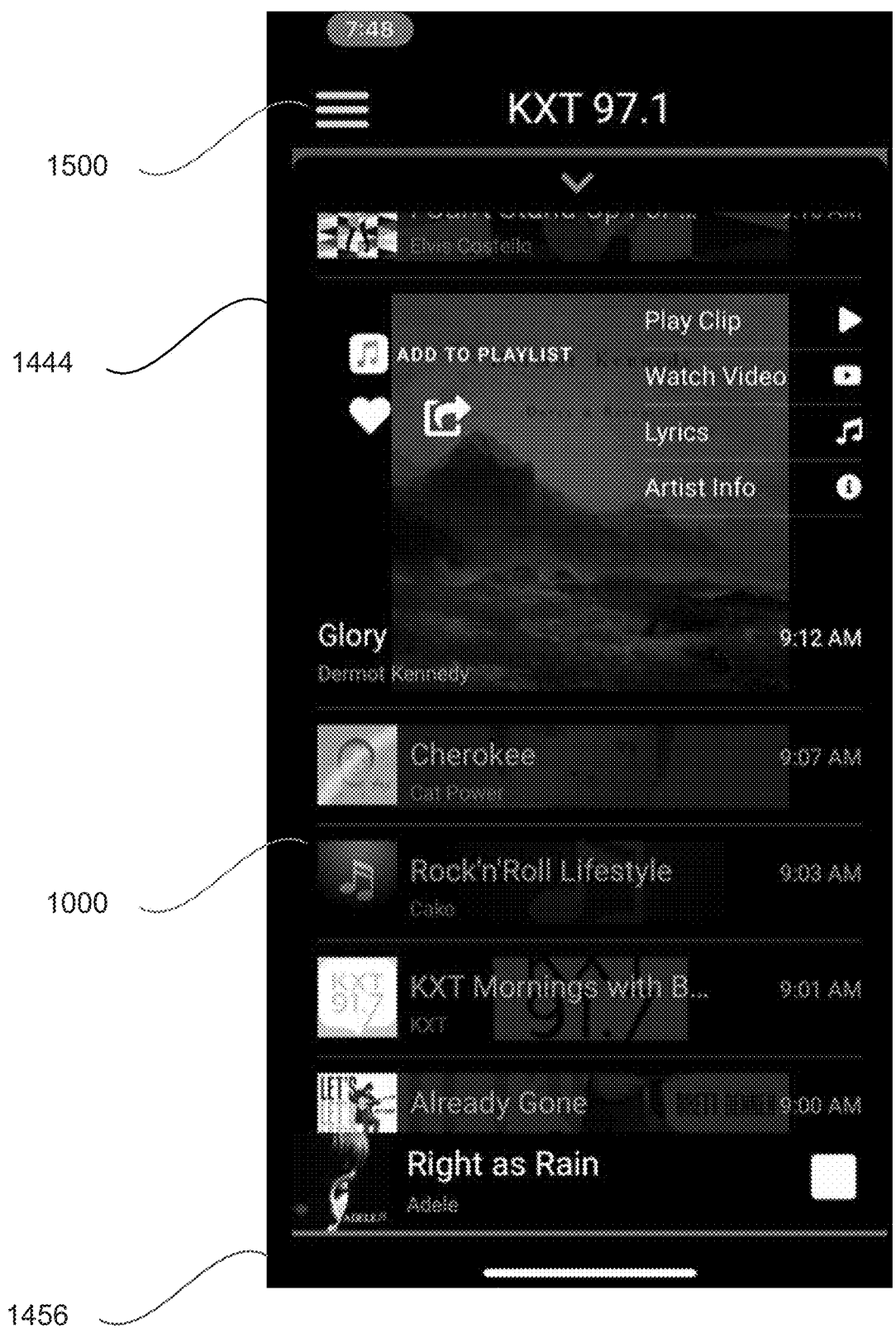
Figure 15C:
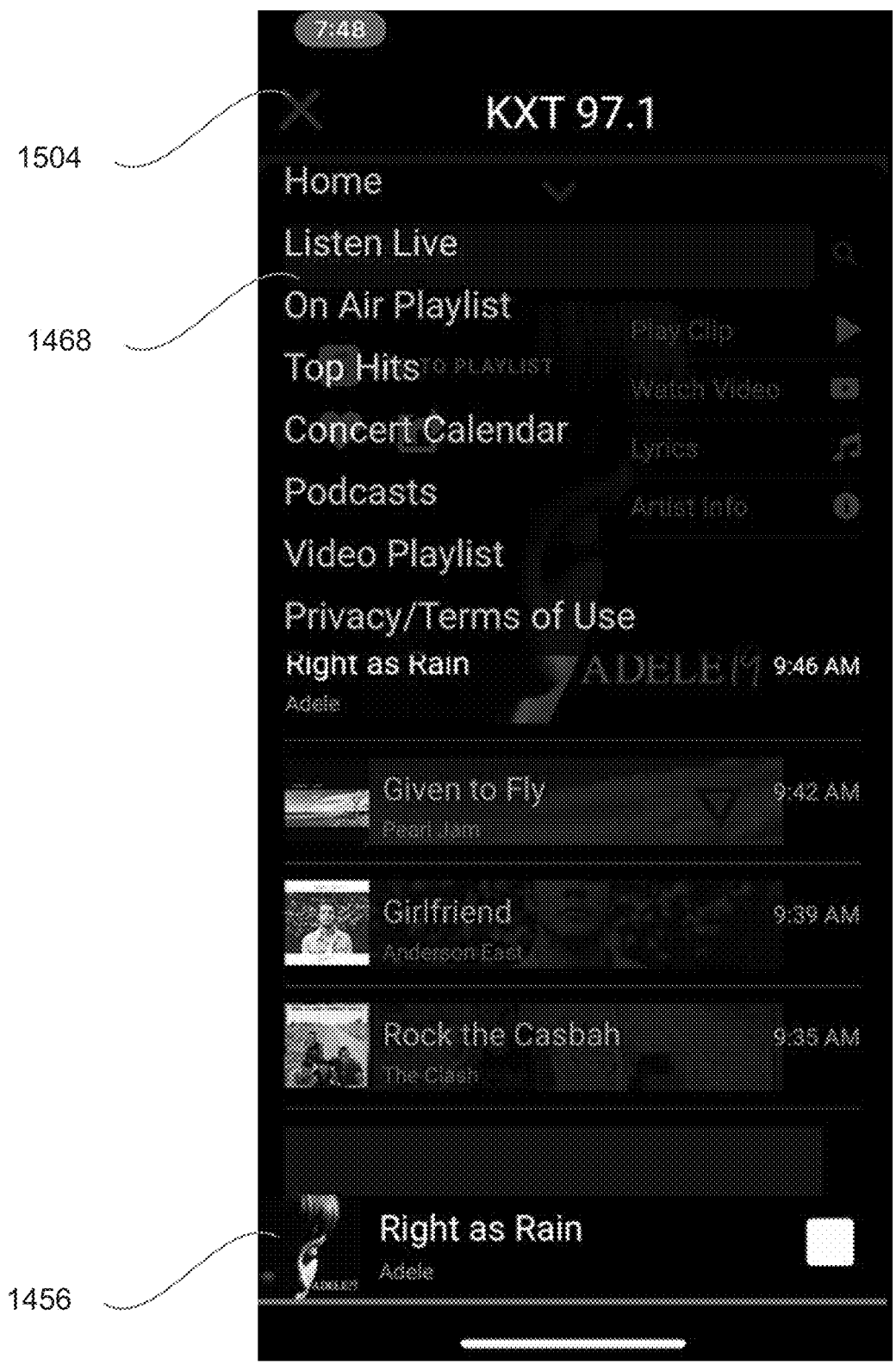

Turning now to FIG. 15A, a screenshot of an exemplary embodiment of continuous application layer 1444 is depicted for illustrative purposes. As shown in FIG. 15A, continuous application layer 1444 may include, e.g., first content viewing portion 1448 in a web-viewer form, with one or more links displayed as hyperlinks, thumbnails, images or the like. Continuous application layer 1444 may further include second content viewing portion 1456 in, as a non-limiting example, a media player form similar to media player forms as described and depicted above in reference to FIGS. 1-13. Second content viewing portion 1456 may include an extension as described above in reference to FIGS. 1-13; such an extension, which may be activated by user activation of an arrow or similar facility, may enable display of one or more additional data and/or links, according to any method or methods as described above in reference to FIGS. 1-13. FIG. 15B is an exemplary screenshot showing continuous application layer 1444 with extension activated in an embodiment. Continuous application layer 1444 may further include an activator 1500 a user may click on, tap, or otherwise activate to cause third content viewing portion 1468 to display, for instance as shown in FIG. 15C. Third content viewing portion 1468 may include one or more links. Third content viewing portion 1468 may include a deactivator 1504, which may be a "close" button or the like, permitting removal or minimization of third content viewing portion 1468.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
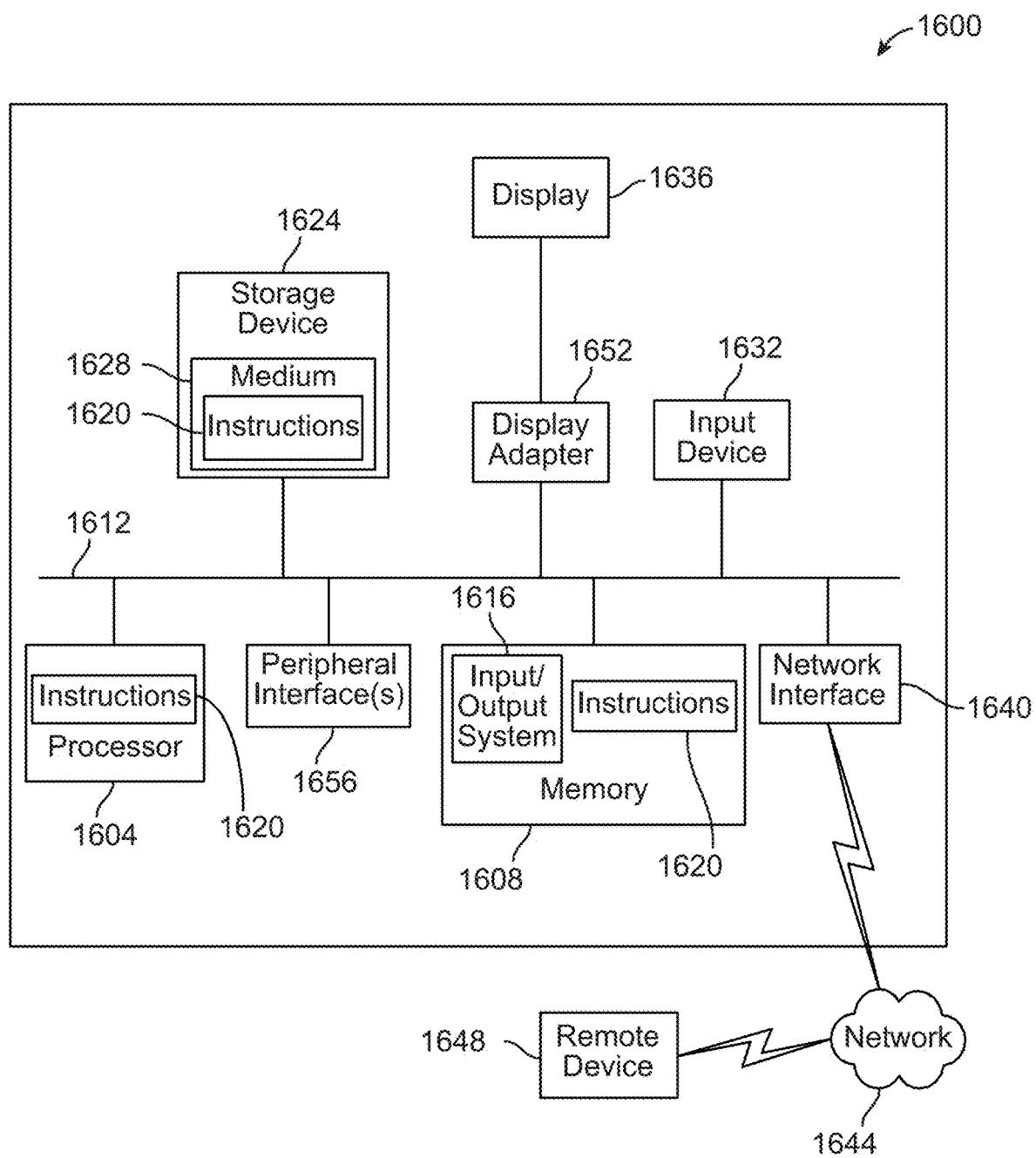
FIG. 16 is a block diagram of a computing system that can be used to implement any one or more of the methodologies disclosed herein and any one or more portions thereof.

FIG. 16 shows a diagrammatic representation of one embodiment of a computing device in the exemplary form of a computer system 1600 within which a set of instructions for causing a control system, such as the above-described systems and methods, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine-readable media) including, but not limited to, a random access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1624 (or one or more components thereof) may be removably interfaced with computer system 1600 (e.g., via an external port connector (not shown)). Particularly, storage device 1624 and, an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display device 1636. Examples of a display device include, but are not limited to, a liquid crystal display (LCD), a cathode ray tube (CRT), a plasma display, a light emitting diode (LED) display, and any combinations thereof. Display adapter 1652 and display device 1636 may be utilized in combination with processor 1604 to provide graphical representations of aspects of the present disclosure. In addition to a display device, computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A platform-agnostic thick-client system for combined delivery of disparate streaming content and dynamic content by combining dynamic data with output from a continuous queue transmitter, the system comprising:
   at least a server designed and configured to provide a first corpus of data;
   a dynamic content transmitter, wherein the dynamic content transmitter is configured to:
      generate a first dynamic packet set that combines at least first a portion of the first corpus with a first client redirection link that directs an entire display window of a client program at the remote device to load a second dynamic packet set upon activation;
      transmit the first dynamic content packet set to the remote device;
   a client-side module operating on the at least a server, wherein the client-side module designs and configures the remote device to:
      receive the dynamic content packet set at the remote device;
      parse the dynamic content packet set to identify the first client redirection link;
      determine that the second dynamic packet set is located at the at least a server; and
      generate a continuous application layer in the display window, the continuous application layer including:
         a first content viewing portion displaying a first view of the dynamic content packet set at a display of the remote device; and
         a modified first client redirection link in the first content viewing portion, wherein selection of the modified first client redirection link causes the first content viewing portion to load a first view of the second dynamic packet set upon activation; and
         second content viewing portion displaying with the first content viewing portion, wherein the second content viewing portion continues to display upon activation of the modified first client redirection link.

2. The system of claim 1, wherein:
   the first content viewing portion is displayed in a first layer;
   the second content viewing portion is displayed in a second layer; and
   the second layer is displayed in front of the first layer.

3. The system of claim 1, wherein the client-side module further designs and configures the remote device to continuously receive quanta transmitted by a first continuous queue transmitter, and wherein the second content viewing portion includes a continuous output that continuously inputs received quanta and displays each received quantum at the second content viewing portion, whereby loading the second dynamic packet set in the second viewing portion does not modify the continuous output at the second content viewing portion.

4. The system of claim 3, wherein the client-side module further configures the remote device to continuously receive quanta transmitted by a second continuous queue transmitter.

5. The system of claim 4, wherein the client-side module further configures the remote device to:
receive a terminal quantum of the quanta transmitted by the first continuous queue transmitter; and
display each received quantum of the quanta transmitted by the second continuous queue transmitter in the second content viewing portion after receiving the terminal quantum of the quanta transmitted by the first continuous queue transmitter.

6. The system of claim 4 further comprising a second client redirection link in the first dynamic packet set, wherein selection of the second client redirection link directs the client program at the remote device to:
continuously receive the quanta transmitted by the second continuous queue transmitter; and
display each received quantum of the quanta transmitted by the second continuous queue transmitter at the viewing window.

7. The system of claim 6, wherein the client-side module further configures the remote device to:
identify the second client redirection link; and
display a modified second client redirection link in the first content viewing portion, wherein the modified second client redirection link causes the remote device to halt the continuous output in the second content viewing portion of the quanta received from the first continuous queue transmitter, continuously receive the quanta transmitted by the second continuous queue transmitter, and display each received quantum of the quanta transmitted by the second continuous queue transmitter in the second content viewing portion.

8. The system of claim 6, wherein the client-side module further configures the remote device to:
identify the second client redirection link; and
display a modified second client redirection link in the first content viewing portion, wherein the modified second client redirection link causes the remote device to:
receive a terminal quantum of the quanta transmitted by the first continuous queue transmitter;
continuously receive the quanta transmitted by the second continuous queue transmitter; and
display each received quantum of the quanta transmitted by the second continuous queue transmitter in the second content viewing portion upon receiving the terminal quantum of the quanta transmitted by the first continuous queue transmitter.

9. The system of claim 2, wherein the first continuous queue transmitter operates on the at least a server, and wherein the first continuous queue transmitter is designed and configured to:
continuously remove quanta from a first FIFO queue; and
transmit the continuously removed quanta over a network to the remote device.

10. The system of claim 2, wherein the at least a server further comprises:
a second corpus of data provided at the at least a server; and
a first continuous queue generator operating on the at least a server, wherein the first continuous queue generator is designed and configured to:
convert at least a portion of the second corpus into a first plurality of quanta; and
continuously load quanta of the first plurality of quanta into the first FIFO queue.

11. The system of claim 2, wherein the first continuous queue transmitter does not operate on the at least a server.

12. The system of claim 4, wherein the second continuous queue transmitter operates on the at least a server, and wherein the second continuous queue transmitter is designed and configured to:
continuously remove quanta from a second FIFO queue; and
transmit the continuously removed quanta over a network to the remote device.

13. The system of claim 2, wherein the at least a server further comprises:
a second corpus of data provided at the at least a server; and
a first continuous queue generator operating on the at least a server, wherein the first continuous queue generator is designed and configured to:
convert at least a portion of the second corpus into a first plurality of quanta; and
continuously load quanta of the first plurality of quanta into the first FIFO queue; and
a second continuous queue generator operating on the at least a server, wherein the second continuous queue generator is designed and configured to:
convert at least a portion of a second corpus into a second plurality of quanta; and
continuously load quanta of the second plurality of quanta into the second FIFO queue.

14. The system of claim 6, wherein the first continuous queue transmitter does not operate on the at least a server.

15. The system of claim 1, wherein the first dynamic packet set further comprises a third client redirection link that directs an entire display window of a client program at the remote device to load a third dynamic packet set upon activation, and wherein the client-side module further configures the remote device to:
determine that the third dynamic packet set is not located on the at least a server; and
display in the first content viewing portion a modified third client redirection link, wherein selection of the modified third client redirection link causes the remote device to halt the continuous output in the second content viewing portion, remove the first content viewing portion, remove the second content viewing portion, and load the third dynamic packet set in the display window.

16. The system of claim 1, wherein the second dynamic packet set further includes a fourth client redirection link that directs an entire display window of a client program at the remote device to load a fourth dynamic packet set upon activation of the fourth client redirection link.

17. The system of claim 16, wherein the client-side module further configures the remote device to:
determine that the fourth dynamic packet set is not located on the at least a server; and
display in the first content viewing portion a modified fourth client redirection link, wherein selection of the modified fourth client redirection link causes the remote device to halt the continuous output in the second content viewing portion, remove the first content viewing portion, remove the second content viewing portion, and load the third dynamic packet set in the display window.

18. The system of claim 16, wherein the client-side module further configures the remote device to:

determine that the fourth dynamic packet set is located on the at least a server; and display in the first content viewing portion a modified fourth client redirection link, wherein selection of the modified fourth client redirection link causes the remote device to load a view of the fourth dynamic packet set in the first content viewing portion.

19. The system of claim 1, wherein the client-side module further configures the remote device to:

receive an instruction to generate a second view of the second dynamic packet set; and display the second view of the second dynamic packet set in the second content viewing portion.

20. A method of remotely combining dynamic data with a continuous quantum queue, the method comprising:

continuously transmitting, by a continuous queue transmitter operating on at least a server, quanta from a first-in-first-out (FIFO) queue over a network to a remote device, the quanta generated from a second corpus of data on the at least a server;

transmitting, by a dynamic content transmitter operating on the server, a first dynamic content packet set to the remote device, the first dynamic content packet set including at least a first portion of at least a first corpus and a client redirection link that directs an entire display window of a client program at the remote device to load a second dynamic packet set upon activation; and configuring, by a client-side module operating on the server, the remote device to:

receive the dynamic content packet set at the remote device;

parse the dynamic content packet set to identify the client redirection link;

determine that the second dynamic packet set is located at the at least a server;

continuously receive quanta of the continuously transmitted quanta; and generate a continuous application layer in the display window, the continuous application layer including:

a first content viewing portion displaying a first view of the dynamic content packet set at a display of the remote device;

a second content viewing portion including a continuous output that continuously inputs the received quanta and displays each received quantum at a display of the remote device; and a modified client redirection link that causes the remote device to load the second dynamic packet set in the second content viewing upon activation;

whereby loading the second dynamic packet set in the first viewing portion does not modify the continuous output of the second viewing portion.

* * * * *